United States Patent
Park

(10) Patent No.: US 11,228,205 B2
(45) Date of Patent: *Jan. 18, 2022

(54) WIRELESS POWER TRANSFER METHOD, APPARATUS AND SYSTEM

(71) Applicant: LG ELECTRONICS INC., Seoul (KR)

(72) Inventor: Yongcheol Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 219 days.

This patent is subject to a terminal disclaimer.

(21) Appl. No.: 16/362,074

(22) Filed: Mar. 22, 2019

(65) Prior Publication Data
US 2019/0222062 A1    Jul. 18, 2019

Related U.S. Application Data

(63) Continuation of application No. 15/313,410, filed as application No. PCT/KR2015/006941 on Jul. 6, 2015, now Pat. No. 10,291,068.

(Continued)

(51) Int. Cl.
*H02J 50/10* (2016.01)
*H02J 50/40* (2016.01)
*H02J 50/80* (2016.01)
*H02J 50/90* (2016.01)
*H02J 7/02* (2016.01)

(52) U.S. Cl.
CPC .............. *H02J 50/10* (2016.02); *H02J 7/025* (2013.01); *H02J 50/40* (2016.02); *H02J 50/80* (2016.02); *H02J 50/90* (2016.02)

(58) Field of Classification Search
USPC .......................................... 307/104
See application file for complete search history.

(56) References Cited

U.S. PATENT DOCUMENTS

2011/0176464 A1* 7/2011 Warner .................. H04B 1/713
                                                    370/311
2012/0200158 A1    8/2012 Takei
(Continued)

FOREIGN PATENT DOCUMENTS

WO    WO 2014/027710 A1    2/2014

*Primary Examiner* — Toan T Vu
*Assistant Examiner* — Xuan Ly
(74) *Attorney, Agent, or Firm* — Birch, Stewart, Kolasch & Birch, LLP

(57) ABSTRACT

A wireless power transmitter which performs communication with one or more wireless power receivers, includes a power converter including at least one coil configured to convert current into magnetic field, and a power transmission controller configured to communicate with a wireless power receiver based on a frame, wherein the frame includes a sync pattern and a plurality of slots which have different slot numbers respectively, wherein the sync pattern indicates a first slot as allocated to the wireless power receiver, wherein the power transmission controller receives a first packet from the wireless power receiver in the first slot having a first slot number, and receives a second packet from the wireless power receiver in a second slot having a second slot number, and wherein the second packet includes an information field indicating the first slot number.

20 Claims, 20 Drawing Sheets

Related U.S. Application Data

(60) Provisional application No. 62/021,585, filed on Jul. 7, 2014, provisional application No. 62/064,232, filed on Oct. 15, 2014.

(56) References Cited

U.S. PATENT DOCUMENTS

| | | |
|---|---|---|
| 2012/0326658 A1 | 12/2012 | Kim et al. |
| 2013/0288600 A1 | 10/2013 | Kuusilinna et al. |
| 2014/0008990 A1 | 1/2014 | Yoon |
| 2015/0271816 A1 | 9/2015 | Akkarakaran et al. |

\* cited by examiner

FIG. 20A
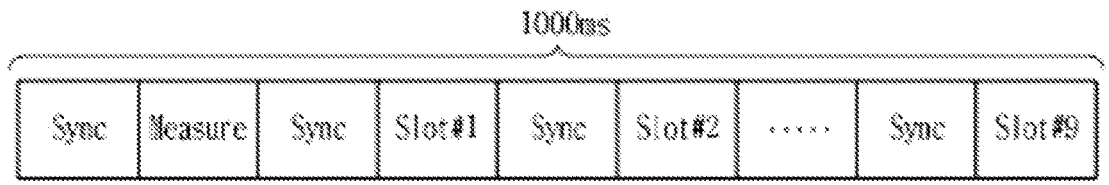
FIG. 20B
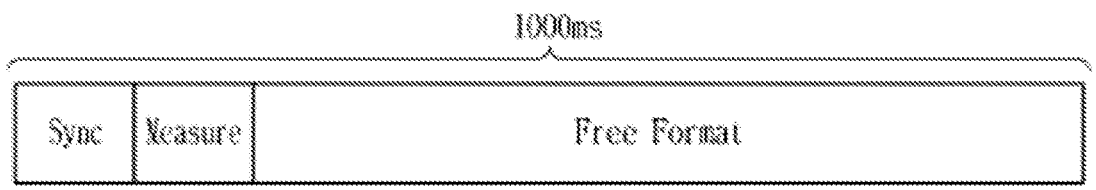
FIG. 21
| Preamble | Zero | Response | Type | Info | Parity |
| Response | Type | Info(Type is ZERO) | Info(Type is ONE) |
|---|---|---|---|
| '00': no comms | ZERO: slot sync | '00': allocated | '00': slotted |
| '01': comms error | ONE: frame sync | '01': locked | '01': free format |
| '10': NAK | | '10': free | '10': reserved |
| '11': ACK | Parity: odd | '11': reserved | '11': reserved |

FIG. 25

CONFIGURATION PACKET — 2700

|  | b7 | b6 | b5 | b4 | b3 | b2 | b1 | b0 |
|---|---|---|---|---|---|---|---|---|
| B0 | Power Class | | Maximum Power | | | | | |
| B1 | Reserved | | | | | | | |
| B2 | Prop | Reserved | | | Zero | Count | | |
| B3 | Window Size | | | | Window Offset | | | |
| B4 | Neg | Pol | Depth | | Reserved | | | |

FIG. 26

SRQ packet — 2800

|  | b7 | b6 | b5 | b4 | b3 | b2 | b1 | b0 |
|---|---|---|---|---|---|---|---|---|
| B0 | Request | | | | | | | |
| B1 | Request Value | | | | | | | |

FIG. 27A

EPT Packet — 2900

|  | b7 | b6 | b5 | b4 | b3 | b2 | b1 | b0 |
|---|---|---|---|---|---|---|---|---|
| B0 | Slot Number | | | | End Power Transfer Code | | | |

EPT Packet — 2930

|  | b7 | b6 | b5 | b4 | b3 | b2 | b1 | b0 |
|---|---|---|---|---|---|---|---|---|
| B0 | End Power Transfer Code | | | | Slot Number | | | |

| Reason | Label | End Power Transfer Code |
|---|---|---|
| Unknown | 00 | 0x00 |
| Charge complete | cc | 0x01 |
| Internal fault | if | 0x02 |
| Over-temperature | ot | 0x03 |
| Over-voltage | ov | 0x04 |
| Over-current | oc | 0x05 |
| Battery failure | bf | 0x06 |
| Reconfigure | rc | 0x07 |
| No response | nr | 0x08 |
| Renegotiate | rn | 0x09 |

FIG. 28A

CHARGE STATUS PACKET

| | $b_7$ | $b_6$ | $b_5$ | $b_4$ | $b_3$ | $b_2$ | $b_1$ | $b_0$ |
|---|---|---|---|---|---|---|---|---|
| $B_0$ | Slot Number | | | | Reserved | | | |
| $B_1$ | Charge Status Value | | | | | | | |

FIG. 28B

CHARGE STATUS PACKET

| | $b_7$ | $b_6$ | $b_5$ | $b_4$ | $b_3$ | $b_2$ | $b_1$ | $b_0$ |
|---|---|---|---|---|---|---|---|---|
| $B_0$ | Reserved | | | | Slot Number | | | |
| $B_1$ | Charge Status Value | | | | | | | |

WIRELESS POWER TRANSFER METHOD, APPARATUS AND SYSTEM

CROSS-REFERENCE TO RELATED APPLICATIONS

The present application is a Continuation of U.S. application Ser. No. 15/313,410 filed Nov. 22, 2016 (now U.S. Pat. No. 10,291,068, issued on May 14, 2019), which is the National Phase of PCT International Application No. PCT/KR2015/006941 filed on Jul. 6, 2015, which claims priority under 35 U.S.C. 119(e) to U.S. Provisional Application Nos. 62/021,585 filed on Jul. 7, 2014 and 62/064,232 filed on Oct. 15, 2014, all of which are hereby expressly incorporated by reference into the resent application.

BACKGROUND OF THE INVENTION

Technical Field

The present invention relates to a wireless power transmission method, a wireless power transmitter, and a wireless charging system.

Background Art

In recent years, the method of contactlessly supplying electrical energy to wireless power receivers in a wireless manner has been used instead of the traditional method of supplying electrical energy in a wired manner. The wireless power receiver that receives energy in a wireless manner may be directly driven by the received wireless power, or a battery may be charged by using the received wireless power, then allowing the wireless power receiver to be driven by the charged power.

For allowing smooth wireless power transfer between a wireless power transmitter which transmits power in a wireless manner and a wireless power receiver which receives power in a wireless manner, the standardization for a technology related to the wireless power transfer is undergoing.

As part of the standardization of wireless power transmission technology, the Wireless Power Consortium (WPC) which deals with magnetic inductive wireless power transmission technology disclosed a standards document "System description Wireless Power Transfer, Volume 1, Low Power, Part 1: Interface Definition, Version 1.00 Release Candidate 1 (RC1)" for interoperability in the wireless power transfer on Apr. 12, 2010.

Established in March, 2012, Power Matters Alliance, another technology standards consortium, disclosed a standards document based on inductive coupling technology to advance a suite of interface standards and provide inductive and resonant power.

Wireless charging using electromagnetic induction is often used in our daily life. Commercial applications of wireless charging using electromagnetic induction are toothbrushes and wireless coffee pots, for example.

Recently, there is a growing demand for one-to-many charging, evolving from one-to-one charging. To meet this demand, a variety of methods of communication between one wireless power transmitter and multiple wireless power receivers are being presented with respect to one-to-many charging.

SUMMARY OF THE INVENTION

Therefore, the present invention has been made in an effort to propose a method of distinguishing at least one wireless power receiver from one another in communication between the at least one wireless power receiver and one wireless power transmitter.

The present invention relates to a wireless power transmission method, a wireless power transmitter, and a wireless charging system which apply in the field of wireless power transmission and reception, and provides a wireless power transmitter which performs communication with a wireless power receiver through multiple slots, the wireless power transmitter comprising: a power converter consisting of at least one coil to convert a current into a magnetic field; and a power transmission controller that receives information associated with a power transfer phase from the wireless power receiver through at least one of the multiple slots, during the transfer of power to the wireless power receiver through the power converter, wherein the information associated with the power transfer phase contains a slot number assigned to the wireless power receiver.

In one exemplary embodiment, the information associated with the power transfer phase may be at least either an end power transfer packet, a charge status packet, or proprietary data packets.

In one exemplary embodiment, the end power transfer packet may contain the slot number and an end power transfer code.

In one exemplary embodiment, the charge status packet may contain the slot number and a charge status value.

In one exemplary embodiment, the slot number may be an unsigned integer.

In one exemplary embodiment, the slot assigned to the wireless power receiver may be one of the multiple slots that is configured to receive control information from the wireless power receiver.

In one exemplary embodiment, the at least one slot may be a free slot.

In one exemplary embodiment, the free slot may be a slot through which the information associated with the power transfer phase is received from either the wireless power receiver or another wireless receiver.

In one exemplary embodiment, the at least one slot may be one of the multiple slots, apart from the one assigned to the wireless power receiver.

The present invention provides a method of controlling a wireless power transmitter performing communication with a wireless power receiver through multiple slots, the method comprising: transmitting power to the wireless power receiver in a wireless manner; and receiving information associated with a power transfer phase from the wireless power receiver through at least one of the multiple slots, during the transfer of power to the wireless power receiver, wherein the information associated with the power transfer phase contains a slot number assigned to the wireless power receiver.

In one exemplary embodiment, the information associated with the power transfer phase may be at least either an end power transfer packet, a charge status packet, or proprietary data packets.

In one exemplary embodiment, the end power transfer packet may contain the slot number and an end power transfer code.

In one exemplary embodiment, the charge status packet may contain the slot number and a charge status value.

In one exemplary embodiment, the slot assigned to the wireless power receiver may be one of the multiple slots that is configured to receive control information from the wireless power receiver.

In one exemplary embodiment, the at least one slot may be a free slot.

In one exemplary embodiment, the free slot may be a slot through which the information associated with the power transfer phase is received from either the wireless power receiver or another wireless receiver.

In one exemplary embodiment, the at least one slot may be one of the multiple slots, apart from the one assigned to the wireless power receiver.

The present invention provides a wireless power receiver which performs communication with a wireless power transmitter through multiple slots, the wireless power receiver comprising: a power receiving part consisting of at least one coil to convert a current into a magnetic field; and a power reception controller that transmits information associated with a power transfer phase to the wireless power transmitter through at least one of the multiple slots, during the reception of power from the wireless power transmitter through the power receiving unit, wherein the information associated with the power transfer phase contains a slot number assigned to the wireless power receiver.

In one exemplary embodiment, the information associated with the power transfer phase may be at least either an end power transfer packet, a charge status packet, or proprietary data packets.

The present invention provides a method of controlling a wireless power receiver performing communication with a wireless power transmitter through multiple slots, the wireless power receiver comprising: a power receiving part consisting of at least one coil to convert a current into a magnetic field; and a power reception controller that transmits information associated with a power transfer phase to the wireless power transmitter through at least one of the multiple slots, during the reception of power from the wireless power transmitter through the power receiving unit, wherein the information associated with the power transfer phase contains a slot number assigned to the wireless power receiver.

In the present invention, a wireless power transmitter communicating with at least one wireless power receiver may be provided with the source of information received from the at least one wireless power receiver, by using slot information.

Therefore, the wireless power transmitter may recognize the source of information received from at least one wireless power receiver.

BRIEF DESCRIPTION OF THE DRAWINGS

FIGS. 20A and 20B are views showing frame structures for performing communication according to the present invention;

FIG. 21 illustrates a sync pattern according to the present invention;

FIG. 25 illustrates the structure of a configuration packet;

FIG. 26 illustrates the structure of an SRQ packet;

FIGS. 27A, 27B, and 27C illustrate the structures of an end power transfer packet; and FIGS. 28A and 28B illustrate the structures of a charge status packet.

DETAILED DESCRIPTION OF THE EMBODIMENTS

Figure 1:
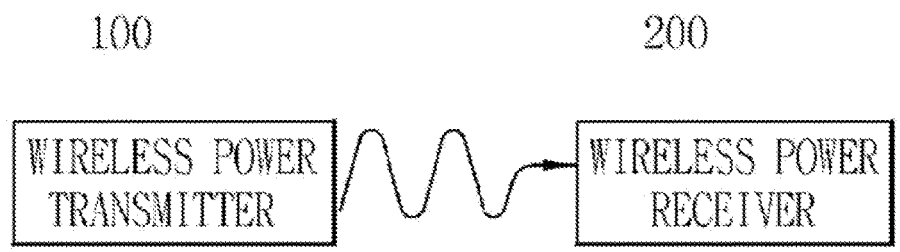
FIG. 1 is an exemplary view conceptually illustrating a wireless power transmitter and a wireless power receiver according to the embodiments of the present invention.

The technologies disclosed herein may be applicable to wireless power transfer (contactless power transfer). However, the technologies disclosed herein are not limited to this, and may be also applicable to all kinds of power transmission systems and methods, wireless charging circuits and methods to which the technological spirit of the technology can be applicable, in addition to the methods and apparatuses using power transmitted in a wireless manner.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

In addition, a suffix "module" or "unit" used for constituent elements disclosed in the following description is merely intended for easy description of the specification, and the suffix itself does not give any special meaning or function.

Furthermore, the terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

Hereinafter, preferred embodiments of the present invention will be described in detail with reference to the accompanying drawings, and the same or similar elements are designated with the same numeral references regardless of the numerals in the drawings and their redundant description will be omitted.

In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

Definition

Many-to-one communication: communicating between one transmitter (Tx) and many receivers (Rx)

Unidirectional communication: transmitting a required message only from a receiver to a transmitter Here, the transmitter and the receiver indicate the same as a transmitting unit (device) and a receiving unit (device), respectively. Hereinafter, those terms may be used together.

Conceptual view of wireless power transmitter and wireless power receiver

FIG. 1 is an exemplary view conceptually illustrating a wireless power transmitter and a wireless power receiver according to the embodiments of the present invention.

Referring to FIG. 1, the wireless power transmitter 100 may be a power transfer apparatus configured to transfer power required for the wireless power receiver 200 in a wireless manner.

Furthermore, the wireless power transmitter 100 may be a wireless charging apparatus configured to charge a battery of the wireless power receiver 200 by transferring power in a wireless manner. A case where the wireless power transmitter 100 is a wireless charging apparatus will be described later with reference to FIG. 9.

Additionally, the wireless power transmitter 100 may be implemented with various forms of apparatuses transferring power to the wireless power receiver 200 requiring power in a contactless state.

The wireless power receiver 200 is a device that is operable by receiving power from the wireless power transmitter 100 in a wireless manner. Furthermore, the wireless power receiver 200 may charge a battery using the received wireless power.

On the other hand, an electronic device for receiving power in a wireless manner as described herein should be construed broadly to include a portable phone, a cellular phone, a smart phone, a personal digital assistant (PDA), a portable multimedia player (PMP), a tablet, a multimedia device, or the like, in addition to an input/output device such as a keyboard, a mouse, an audio-visual auxiliary device, and the like.

The wireless power receiver 200, as described later, may be a mobile communication terminal (for example, a portable phone, a cellular phone, and a tablet and the like) or a multimedia device.

On the other hand, the wireless power transmitter 100 may transfer power in a wireless manner without mutual contact to the wireless power receiver 200 using one or more wireless power transfer methods. In other words, the wireless power transmitter 100 may transfer power using at least one of an inductive coupling method based on magnetic induction phenomenon by the wireless power signal and a magnetic resonance coupling method based on electromagnetic resonance phenomenon by a wireless power signal at a specific frequency.

Wireless power transfer in the inductive coupling method is a technology transferring power in a wireless manner using a primary coil and a secondary coil, and refers to the transmission of power by inducing a current from a coil to another coil through a changing magnetic field by a magnetic induction phenomenon.

Wireless power transfer in the inductive coupling method refers to a technology in which the wireless power receiver 200 generates resonance by a wireless power signal transmitted from the wireless power transmitter 100 to transfer power from the wireless power transmitter 100 to the wireless power receiver 200 by the resonance phenomenon.

Hereinafter, the wireless power transmitter 100 and wireless power receiver 200 according to the embodiments disclosed herein will be described in detail. In assigning reference numerals to the constituent elements in each of the following drawings, the same reference numerals will be used for the same constituent elements even though they are shown in a different drawing.

Figure 2A:
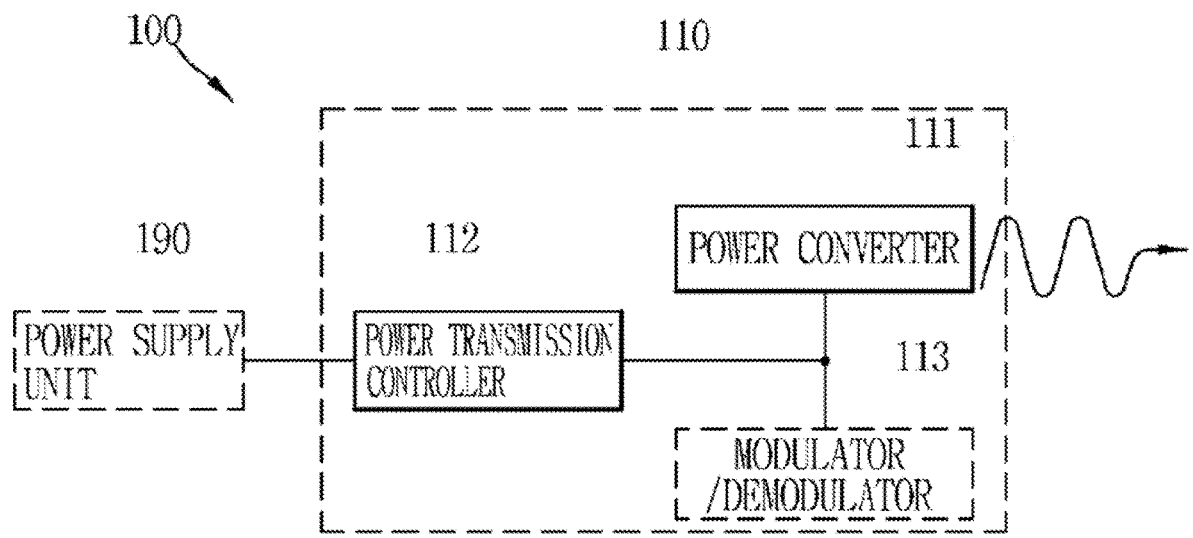
FIGS. 2A and 2B are exemplary block diagrams illustrating the configuration of a wireless power transmitter and a wireless power receiver that can be employed in the embodiments disclosed herein, respectively.
Figure 2B:
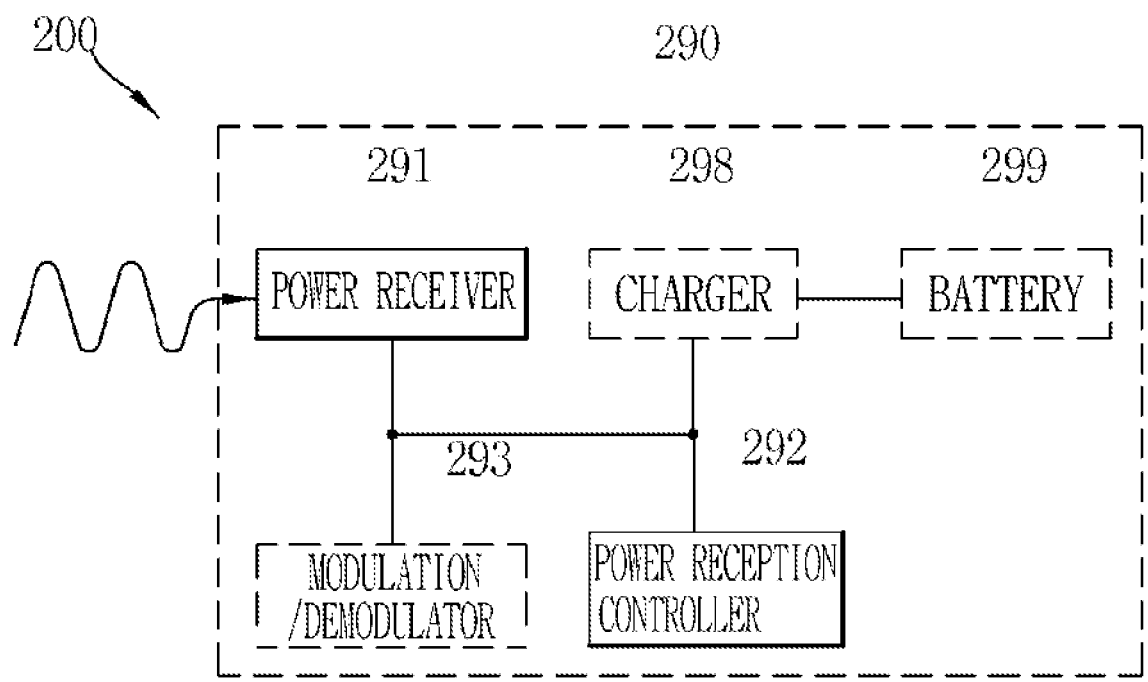

FIGS. 2A and 2B are exemplary block diagrams illustrating the configuration of a wireless power transmitter 100 and a wireless power receiver 200 that can be employed in the embodiments disclosed herein.

Wireless Power Transmitter

Referring to FIG. 2A, the wireless power transmitter 100 may include a power transmission unit 110. The power transmission unit 110 may include a power conversion unit 111 and a power transmission control unit 112.

The power conversion unit 111 transfers power supplied from a transmission side power supply unit 190 to the wireless power receiver 200 by converting it into a wireless power signal. The wireless power signal transferred by the power conversion unit 111 is generated in the form of a magnetic field or electro-magnetic field having an oscillation characteristic. For this purpose, the power conversion unit 111 may be configured to include a coil for generating the wireless power signal.

The power conversion unit 111 may include a constituent element for generating a different type of wireless power signal according to each power transfer method. For example, the power conversion unit 111 may include a primary coil for forming a changing magnetic field to induce a current to a secondary coil of the wireless power receiver 200. Furthermore, the power conversion unit 111 may include a coil (or antenna) for forming a magnetic field having a specific resonant frequency to generate a resonant frequency in the wireless power receiver 200 according to the resonance coupling method.

Furthermore, the power conversion unit 111 may transfer power using at least one of the foregoing inductive coupling method and the resonance coupling method.

Among the constituent elements included in the power conversion unit 111, those for the inductive coupling method will be described later with reference to FIGS. 4 and 5, and those for the resonance coupling method will be described with reference to FIGS. 7 and 8.

On the other hand, the power conversion unit 111 may further include a circuit for controlling the characteristics of a used frequency, an applied voltage, an applied current or the like to form the wireless power signal.

The power transmission control unit 112 controls each of the constituent elements included in the power transmission unit 110. The power transmission control unit 112 may be implemented to be integrated into another control unit (not shown) for controlling the wireless power transmitter 100.

On the other hand, a region to which the wireless power signal can be approached may be divided into two types. First, an active area denotes a region through which a wireless power signal transferring power to the wireless power receiver 200 is passed. Next, a semi-active area denotes an interest region in which the wireless power transmitter 100 can detect the existence of the wireless power receiver 200. Here, the power transmission control unit 112 may detect whether the wireless power receiver 200 is placed in the active area or detection area or removed from the area. Specifically, the power transmission control unit 112 may detect whether or not the wireless power receiver 200 is placed in the active area or detection area using a wireless power signal formed from the power conversion unit 111 or a sensor separately provided therein. For instance, the power transmission control unit 112 may detect the presence of the wireless power receiver 200 by monitoring whether or not the characteristic of power for forming the wireless power signal is changed by the wireless power signal, which is affected by the wireless power receiver 200 existing in the detection area. However, the active area and detection area may vary according to the wireless power transfer method such as an inductive coupling method, a resonance coupling method, and the like.

The power transmission control unit 112 may perform the process of identifying the wireless power receiver 200 or determine whether to start wireless power transfer according to a result of detecting the existence of the wireless power receiver 200.

Furthermore, the power transmission control unit 112 may determine at least one characteristic of a frequency, a voltage, and a current of the power conversion unit 111 for forming the wireless power signal. The determination of the characteristic may be carried out by a condition at the side of the wireless power transmitter 100 or a condition at the side of the wireless power receiver 200.

The power transmission control unit 112 may receive a power control message from the wireless power receiver 200. The power transmission control unit 112 may determine at least one characteristic of a frequency, a voltage and a current of the power conversion unit 111 based on the received power control message, and additionally perform other control operations based on the power control message.

For example, the power transmission control unit 112 may determine at least one characteristic of a frequency, a voltage and a current used to form the wireless power signal according to the power control message including at least one of rectified power amount information, charging state information and identification information in the wireless power receiver 200.

Furthermore, as another control operation using the power control message, the wireless power transmitter 100 may perform a typical control operation associated with wireless power transfer based on the power control message. For example, the wireless power transmitter 100 may receive information associated with the wireless power receiver 200 to be auditorily or visually outputted through the power control message, or receive information required for authentication between devices.

In exemplary embodiments, the power transmission control unit 112 may receive the power control message through the wireless power signal. In other exemplary embodiment, the power transmission control unit 112 may receive the power control message through a method for receiving user data.

In order to receive the foregoing power control message, the wireless power transmitter 100 may further include a modulation/demodulation unit 113 electrically connected to the power conversion unit 111. The modulation/demodulation unit 113 may modulate a wireless power signal that has been modulated by the wireless power receiver 200 and use it to receive the power control message.

In addition, the power transmission control unit 112 may acquire a power control message by receiving user data including a power control message by a communication means (not shown) included in the wireless power transmitter 100.

[For Supporting In-Band Two-Way Communication]

Under a wireless power transfer environment allowing for bi-directional communications according to the exemplary embodiments disclosed herein, the power transmission control unit 112 may transmit data to the wireless power receiver 200. The data transmitted by the power transmission control unit 112 may be transmitted to request the wireless power receiver 200 to send the power control message.

Wireless Power Receiver

Referring to FIG. 2B, the wireless power receiver 200 may include a power supply unit 290. The power supply unit 290 supplies power required for the operation of the wireless power receiver 200. The power supply unit 290 may include a power receiving unit 291 and a power reception control unit 292.

The power receiving unit 291 receives power transferred from the wireless power transmitter 100 in a wireless manner.

The power receiving unit 291 may include constituent elements required to receive the wireless power signal according to a wireless power transfer method. Furthermore, the power receiving unit 291 may receive power according to at least one wireless power transfer method, and in this case, the power receiving unit 291 may include constituent elements required for each method.

First, the power receiving unit 291 may include a coil for receiving a wireless power signal transferred in the form of a magnetic field or electromagnetic field having a vibration characteristic.

For instance, as a constituent element according to the inductive coupling method, the power receiving unit 291 may include a secondary coil to which a current is induced by a changing magnetic field. In exemplary embodiments, the power receiving unit 291, as a constituent element according to the resonance coupling method, may include a coil and a resonant circuit in which resonance phenomenon is generated by a magnetic field having a specific resonant frequency.

In another exemplary embodiments, when the power receiving unit 291 receives power according to at least one wireless power transfer method, the power receiving unit 291 may be implemented to receive power by using a coil, or implemented to receive power by using a coil formed differently according to each power transfer method.

Among the constituent elements included in the power receiving unit 291, those for the inductive coupling method will be described later with reference to FIGS. 4A and 4B, and those for the resonance coupling method with reference to FIGS. 7a and 7b.

On the other hand, the power receiving unit 291 may further include a rectifier and a regulator to convert the wireless power signal into a direct current. Furthermore, the power receiving unit 291 may further include a circuit for protecting an overvoltage or overcurrent from being generated by the received power signal.

The power reception control unit 292 may control each constituent element included in the power supply unit 290.

Specifically, the power reception control unit 292 may transfer a power control message to the wireless power transmitter 100. The power control message may instruct the wireless power transmitter 100 to initiate or terminate a transfer of the wireless power signal. Furthermore, the power control message may instruct the wireless power transmitter 100 to control a characteristic of the wireless power signal.

In exemplary embodiments, the power reception control unit 292 may transmit the power control message through at least one of the wireless power signal and user data.

In order to transmit the foregoing power control message, the wireless power receiver 200 may further include a modulation/demodulation unit 293 electrically connected to the power receiving unit 291. The modulation/demodulation unit 293, similarly to the case of the wireless power transmitter 100, may be used to transmit the power control message through the wireless power signal. The power communications modulation/demodulation unit 293 may be used as a means for controlling a current and/or voltage flowing through the power conversion unit 111 of the wireless power transmitter 100. Hereinafter, a method for allowing the power communications modulation/demodulation unit 113 or 293 at the side of the wireless power transmitter 100 and at the side of the wireless power receiver 200, respectively, to be used to transmit and receive a power control message through a wireless power signal will be described.

A wireless power signal formed by the power conversion unit 111 is received by the power receiving unit 291. At this time, the power reception control unit 292 controls the power communications modulation/demodulation unit 293 at the side of the wireless power receiver 200 to modulate the wireless power signal. For instance, the power reception control unit 292 may perform a modulation process such that a power amount received from the wireless power signal is varied by changing a reactance of the power communications modulation/demodulation unit 293 connected to the power receiving unit 291. The change of a power amount received from the wireless power signal results in the change of a current and/or voltage of the power conversion unit 111 for forming the wireless power signal. At this time, the modulation/demodulation unit 113 at the side of the wireless power transmitter 100 may detect a change of the current and/or voltage to perform a demodulation process.

In other words, the power reception control unit 292 may generate a packet including a power control message intended to be transferred to the wireless power transmitter 100 and modulate the wireless power signal to allow the packet to be included therein, and the power transmission control unit 112 may decode the packet based on a result of performing the demodulation process of the power communications modulation/demodulation unit 113 to acquire the power control message included in the packet.

In addition, the power reception control unit 292 may transmit a power control message to the wireless power transmitter 100 by transmitting user data including the power control message by a communication means (not shown) included in the wireless power receiver 200.

[For Supporting In-Band Two-Way Communication]

Under a wireless power transfer environment allowing for bi-directional communications according to the exemplary embodiments disclosed herein, the power reception control unit 292 may receive data to the wireless power transmitter 100. The data transmitted by the wireless power transmitter 100 may be transmitted to request the wireless power receiver 200 to send the power control message.

In addition, the power supply unit 290 may further include a charger 298 and a battery 299.

The wireless power receiver 200 receiving power for operation from the power supply unit 290 may be operated by power transferred from the wireless power transmitter 100, or operated by charging the battery 299 using the transferred power and then receiving the charged power. At this time, the power reception control unit 292 may control the charger 298 to perform charging using the transferred power.

Hereinafter, description will be given of a wireless power transmitter and a wireless power receiver applicable to the exemplary embodiments disclosed herein. First, a method of allowing the wireless power transmitter to transfer power to the electronic device according to the inductive coupling method will be described with reference to FIGS. 3 through 5.

Inductive Coupling Method

Figure 3:
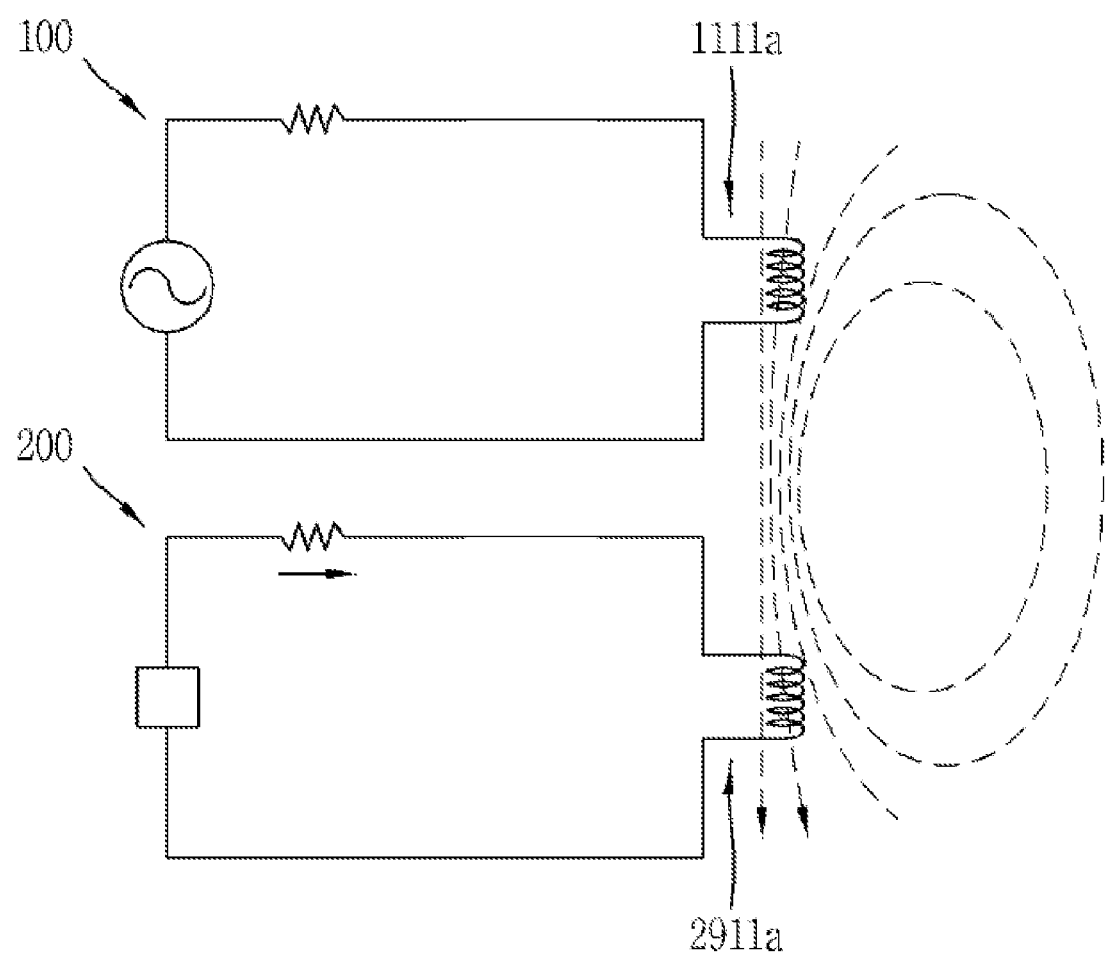
FIG. 3 is a view illustrating a concept in which power is transferred from a wireless power transmitter to a wireless power receiver in a wireless manner according to an inductive coupling method.

FIG. 3 is a view illustrating a concept in which power is transferred from a wireless power transmitter to an electronic device in a wireless manner according to an inductive coupling method.

When the power of the wireless power transmitter 100 is transferred in an inductive coupling method, if the strength of a current flowing through a primary coil within the power transmission unit 110 is changed, then a magnetic field passing through the primary coil will be changed by the current. The changed magnetic field generates an induced electromotive force at a secondary coil in the wireless power receiver 200.

According to the foregoing method, the power conversion unit 111 of the wireless power transmitter 100 may include a transmitting (Tx) coil 1111a being operated as a primary coil in magnetic induction. Furthermore, the power receiving unit 291 of the wireless power receiver 200 may include a receiving (Rx) coil 2911a being operated as a secondary coil in magnetic induction.

First, the wireless power transmitter 100 and wireless power receiver 200 are disposed in such a manner that the transmitting coil 1111a at the side of the wireless power transmitter 100 and the receiving coil at the side of the wireless power receiver 200 are located adjacent to each other. Then, if the power transmission control unit 112 controls a current of the transmitting coil (Tx coil) 1111a to be changed, then the power receiving unit 291 controls power to be supplied to the wireless power receiver 200 using an electromotive force induced to the receiving coil (Rx coil) 2911a.

The efficiency of wireless power transfer by the inductive coupling method may be little affected by a frequency characteristic, but affected by an alignment and distance between the wireless power transmitter 100 and the wireless power receiver 200 including each coil.

On the other hand, in order to perform wireless power transfer in the inductive coupling method, the wireless power transmitter 100 may be configured to include an interface surface (not shown) in the form of a flat surface. One or more electronic devices may be placed at an upper portion of the interface surface, and the transmitting coil 1111a may be mounted at a lower portion of the interface surface. In this case, a vertical spacing is formed in a small-scale between the transmitting coil 1111a mounted at a lower portion of the interface surface and the receiving coil 2911a of the wireless power receiver 200 placed at an upper portion of the interface surface, and thus a distance between the coils becomes sufficiently small to efficiently implement contactless power transfer by the inductive coupling method.

Furthermore, an alignment indicator (not shown) indicating a location where the wireless power receiver 200 is to be placed at an upper portion of the interface surface. The alignment indicator indicates a location of the wireless power receiver 200 where an alignment between the transmitting coil 1111a mounted at a lower portion of the interface surface and the receiving coil 2911a can be suitably implemented. The alignment indicator may alternatively be simple marks, or may be formed in the form of a protrusion structure for guiding the location of the wireless power receiver 200. Otherwise, the alignment indicator may be formed in the form of a magnetic body such as a magnet mounted at a lower portion of the interface surface, thereby guiding the coils to be suitably arranged by mutual magnetism to a magnetic body having an opposite polarity mounted within the wireless power receiver 200.

On the other hand, the wireless power transmitter 100 may be formed to include one or more transmitting coils. The wireless power transmitter 100 may selectively use some of coils suitably arranged with the receiving coil 2911a of the wireless power receiver 200 among the one or more transmitting coils to enhance the power transmission efficiency. The wireless power transmitter 100 including the one or more transmitting coils will be described later with reference to FIG. 5.

Hereinafter, configurations of the wireless power transmitter and electronic device using an inductive coupling method applicable to the embodiments disclosed herein will be described in detail.

Wireless Power Transmitter and Electronic Device in Inductive Coupling Method

Figure 4A:
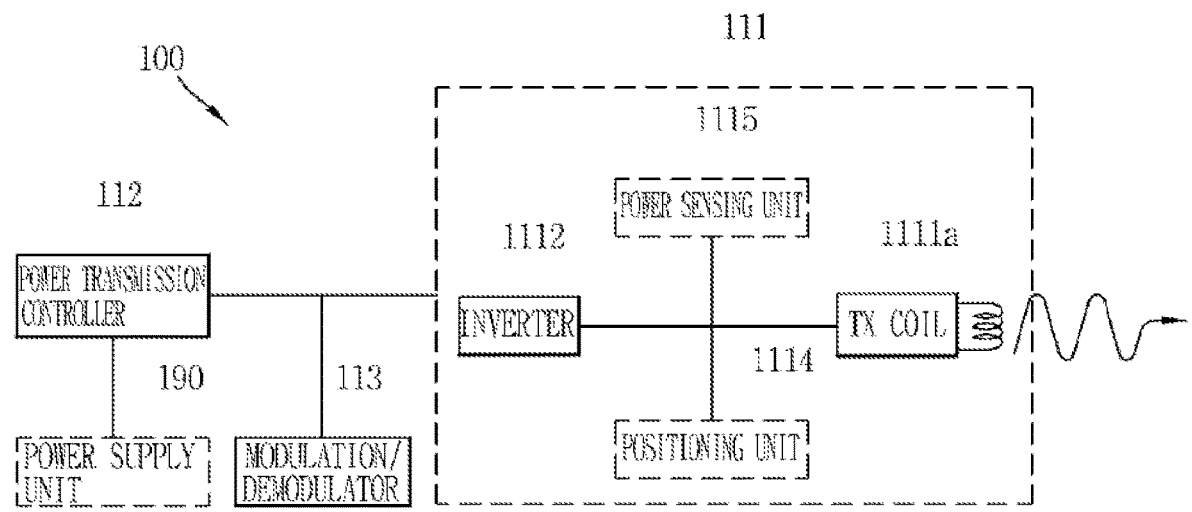
FIGS. 4A and 4B are block diagrams illustrating part of the wireless power transmitter and wireless power receiver in a magnetic induction method that can be employed in the embodiments disclosed herein.
Figure 4B:
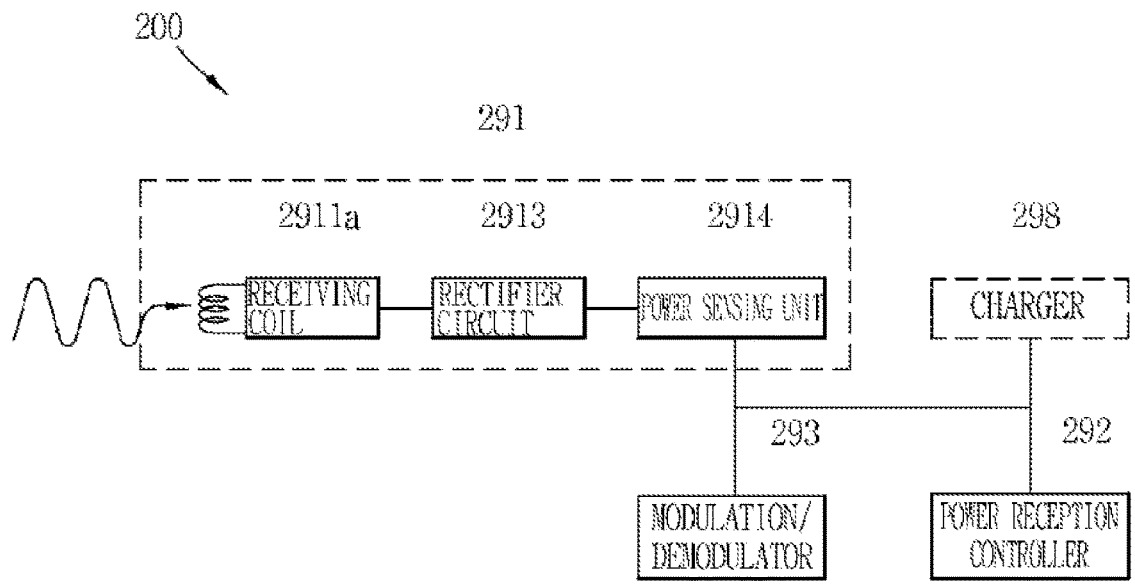

FIGS. 4A and 4B are a block diagram illustrating part of the wireless power transmitter 100 and wireless power receiver 200 in a magnetic induction method that can be employed in the embodiments disclosed herein. A configuration of the power transmission unit 110 included in the wireless power transmitter 100 will be described with reference to FIG. 4A, and a configuration of the power supply unit 290 included in the wireless power receiver 200 will be described with reference to FIG. 4B.

Referring to FIG. 4A, the power conversion unit 111 of the wireless power transmitter 100 may include a transmitting (Tx) coil 1111a and an inverter 1112.

The transmitting coil 1111a may form a magnetic field corresponding to the wireless power signal according to a change of current as described above. The transmitting coil 1111a may alternatively be implemented with a planar spiral type or cylindrical solenoid type.

The inverter 1112 transforms a DC input obtained from the power supply unit 190 into an AC waveform. The AC current transformed by the inverter 1112 drives a resonant circuit including the transmitting coil 1111a and a capacitor (not shown) to form a magnetic field in the transmitting coil 1111a.

In addition, the power conversion unit 111 may further include a positioning unit 1114.

The positioning unit 1114 may move or rotate the transmitting coil 1111a to enhance the effectiveness of contactless power transfer using the inductive coupling method. As described above, it is because an alignment and distance between the wireless power transmitter 100 and the wireless power receiver 200 including a primary coil and a secondary coil may affect power transfer using the inductive coupling method. In particular, the positioning unit 1114 may be used when the wireless power receiver 200 does not exist within an active area of the wireless power transmitter 100.

Accordingly, the positioning unit 1114 may include a drive unit (not shown) for moving the transmitting coil 1111a such that a center-to-center distance of the transmitting coil 1111a of the wireless power transmitter 100 and the receiving coil 2911a of the wireless power receiver 200 is within a predetermined range, or rotating the transmitting coil 1111a such that the centers of the transmitting coil 1111a and the receiving coil 2911a are overlapped with each other.

For this purpose, the wireless power transmitter 100 may further include a detection unit (not shown) made of a sensor for detecting the location of the wireless power receiver 200, and the power transmission control unit 112 may control the positioning unit 1114 based on the location information of the wireless power receiver 200 received from the location detection sensor.

Furthermore, to this end, the power transmission control unit 112 may receive control information on an alignment or distance to the wireless power receiver 200 through the power communications modulation/demodulation unit 113, and control the positioning unit 1114 based on the received control information on the alignment or distance.

If the power conversion unit 111 is configured to include a plurality of transmitting coils, then the positioning unit 1114 may determine which one of the plurality of transmitting coils is to be used for power transmission. The configuration of the wireless power transmitter 100 including the plurality of transmitting coils will be described later with reference to FIG. 5.

On the other hand, the power conversion unit 111 may further include a power sensing unit 1115. The power sensing unit 1115 at the side of the wireless power transmitter 100 monitors a current or voltage flowing into the transmitting coil 1111a. The power sensing unit 1115 is provided to check whether or not the wireless power transmitter 100 is normally operated, and thus the power sensing unit 1115 may detect a voltage or current of the power supplied from the outside, and check whether the detected voltage or current exceeds a threshold value. The power sensing unit 1115, although not shown, may include a resistor for detecting a voltage or current of the power supplied from the outside and a comparator for comparing a voltage value or current value of the detected power with a threshold value to output the comparison result. Based on the check result of the power sensing unit 1115, the power transmission control unit 112 may control a switching unit (not shown) to cut off power applied to the transmitting coil 1111a.

Referring to FIG. 4B, the power supply unit 290 of the wireless power receiver 200 may include a receiving (Rx) coil 2911a and a rectifier 2913.

A current is induced into the receiving coil 2911a by a change of the magnetic field formed in the transmitting coil 1111a. The implementation type of the receiving coil 2911a may be a planar spiral type or cylindrical solenoid type similarly to the transmitting coil 1111a.

Furthermore, series and parallel capacitors may be configured to be connected to the receiving coil 2911a to enhance the effectiveness of wireless power reception or perform resonant detection.

The receiving coil 2911a may be in the form of a single coil or a plurality of coils.

The rectifier 2913 performs a full-wave rectification to a current to convert alternating current into direct current. The rectifier 2913, for instance, may be implemented with a full-bridge rectifier made of four diodes or a circuit using active components.

In addition, the rectifier 2913 may further include a regulator for converting a rectified current into a more flat and stable direct current. Furthermore, the output power of the rectifier 2913 is supplied to each constituent element of the power supply unit 290. Furthermore, the rectifier 2913 may further include a DC-DC converter for converting output DC power into a suitable voltage to adjust it to the power required for each constituent element (for instance, a circuit such as a charger 298).

The power communications modulation/demodulation unit 293 may be connected to the power receiving unit 291, and may be configured with a resistive element in which resistance varies with respect to direct current, and may be configured with a capacitive element in which reactance varies with respect to alternating current. The power reception control unit 292 may change the resistance or reactance of the power communications modulation/demodulation unit 293 to modulate a wireless power signal received to the power receiving unit 291.

On the other hand, the power supply unit 290 may further include a power sensing unit 2914. The power sensing unit 2914 at the side of the wireless power receiver 200 monitors a voltage and/or current of the power rectified by the rectifier 2913, and if the voltage and/or current of the rectified power exceeds a threshold value as a result of monitoring, then the power reception control unit 292 transmits a power control message to the wireless power transmitter 100 to transfer suitable power.

Wireless Power Transmitter Configured to Include One or More Transmitting Coils

Figure 5:
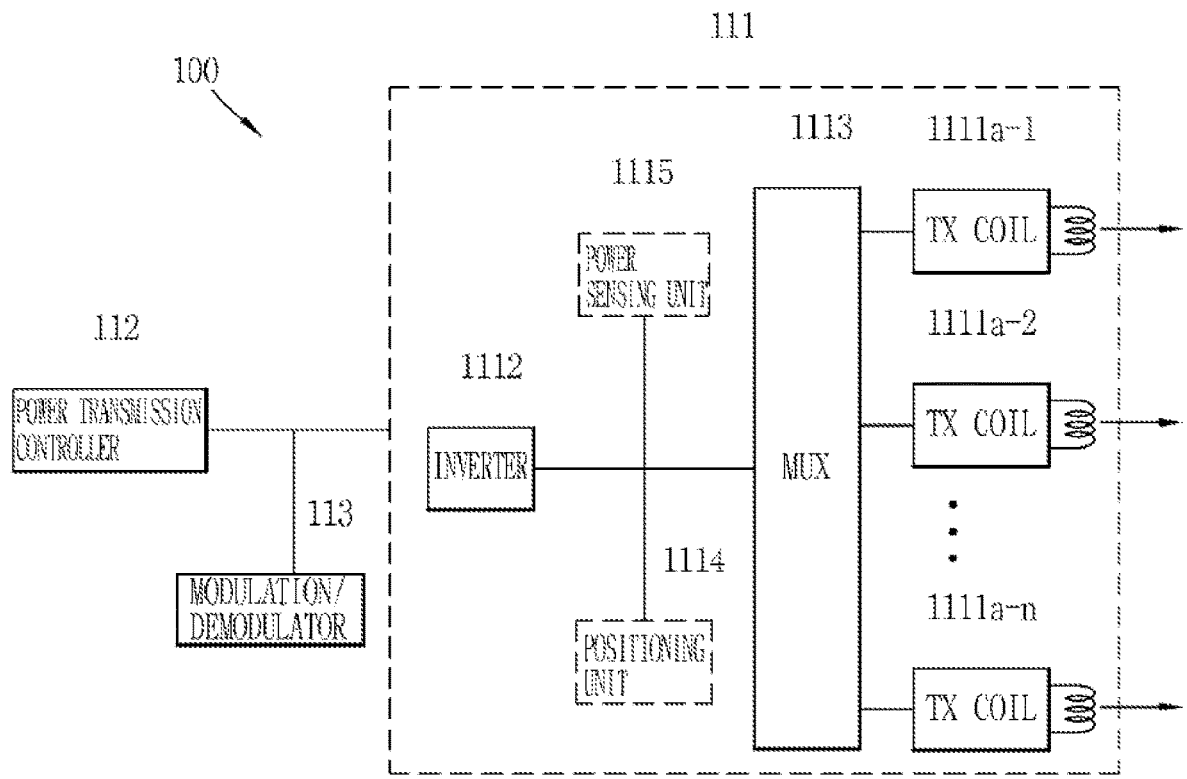
FIG. 5 is a block diagram illustrating a wireless power transmitter configured to have one or more transmitting coils receiving power according to an inductive coupling method that can be employed in the embodiments disclosed herein.

FIG. 5 is a block diagram illustrating a wireless power transmitter configured to have one or more transmission coils receiving power according to an inductive coupling method that can be employed in the embodiments disclosed herein.

Referring to FIG. 5, the power conversion unit 111 of the wireless power transmitter 100 according to the embodiments disclosed herein may include one or more transmitting coils 1111a-1 to 1111a-n. The one or more transmitting coils 1111a-1 to 1111a-n may be an array of partly overlapping primary coils. An active area may be determined by some of the one or more transmitting coils.

The one or more transmitting coils 1111a-1 to 1111a-n may be mounted at a lower portion of the interface surface. Furthermore, the power conversion unit 111 may further include a multiplexer 1113 for establishing and releasing the connection of some of the one or more transmitting coils 1111a-1 to 1111a-n.

Upon detecting the location of the wireless power receiver 200 placed at an upper portion of the interface surface, the power transmission control unit 112 may take the detected location of the wireless power receiver 200 into consideration to control the multiplexer 1113, thereby allowing coils that can be placed in an inductive coupling relation to the receiving coil 2911a of the wireless power receiver 200 among the one or more transmitting coils 1111a-1 to 1111a-n to be connected to one another.

For this purpose, the power transmission control unit 112 may acquire the location information of the wireless power receiver 200. For example, the power transmission control unit 112 may acquire the location of the wireless power receiver 200 on the interface surface by the location detection unit (not shown) provided in the wireless power transmitter 100. For another example, the power transmission control unit 112 may alternatively receive a power control message indicating a strength of the wireless power signal from an object on the interface surface or a power control message indicating the identification information of the object using the one or more transmitting coils 1111a-1 to 1111a-n, respectively, and determines whether it is located adjacent to which one of the one or more transmitting coils based on the received result, thereby acquiring the location information of the wireless power receiver 200.

On the other hand, the active area as part of the interface surface may denote a portion through which a magnetic field with a high efficiency can pass when the wireless power transmitter 100 transfers power to the wireless power receiver 200 in a wireless manner. At this time, a single transmitting coil or one or a combination of more transmitting coils forming a magnetic field passing through the active area may be designated as a primary cell. Accordingly, the power transmission control unit 112 may determine an active area based on the detected location of the wireless power receiver 200, and establish the connection of a primary cell corresponding to the active area to control the multiplexer 1113, thereby allowing the receiving coil 2911a of the wireless power receiver 200 and the coils belonging to the primary cell to be placed in an inductive coupling relation.

Furthermore, the power conversion unit 111 may further include an impedance matching unit (not shown) for controlling an impedance to form a resonant circuit with the coils connected thereto.

Hereinafter, a method for allowing a wireless power transmitter to transfer power according to a resonance coupling method will be disclosed with reference to FIGS. 6 through 8.

Resonance Coupling Method

Figure 6:
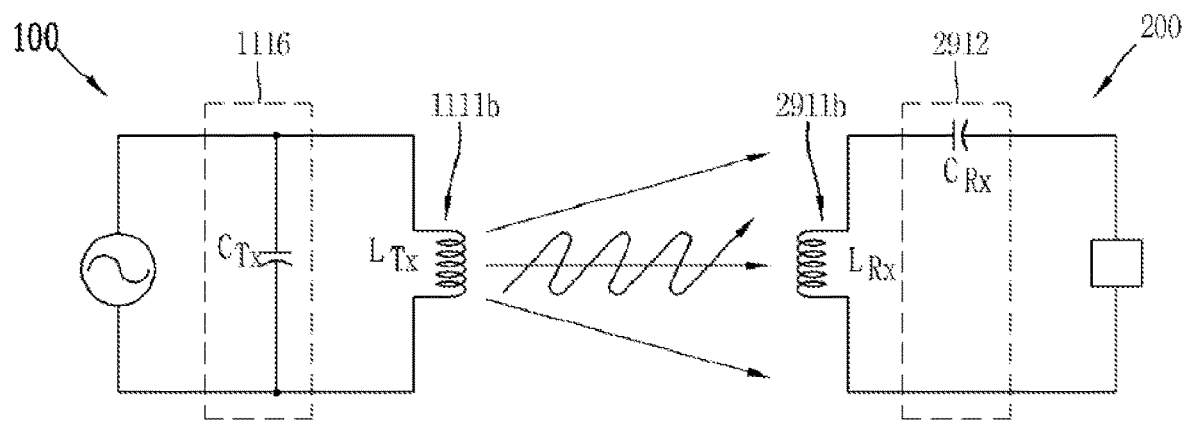
FIG. 6 is a view illustrating a concept in which power is transferred to a wireless power receiver from a wireless power transmitter in a wireless manner according to a resonance coupling method.

FIG. 6 is a view illustrating a concept in which power is transferred to an electronic device from a wireless power transmitter in a wireless manner according to a resonance coupling method.

First, resonance will be described in brief as follows. Resonance refers to a phenomenon in which amplitude of vibration is remarkably increased when periodically receiving an external force having the same frequency as the natural frequency of a vibration system. Resonance is a phenomenon occurring at all kinds of vibrations such as mechanical vibration, electric vibration, and the like. Generally, when exerting a vibratory force to a vibration system from the outside, if the natural frequency thereof is the same as a frequency of the externally applied force, then the vibration becomes strong, thus increasing the width.

With the same principle, when a plurality of vibrating bodies separated from one another within a predetermined distance vibrate at the same frequency, the plurality of vibrating bodies resonate with one another, and in this case, resulting in a reduced resistance between the plurality of vibrating bodies. In an electrical circuit, a resonant circuit can be made by using an inductor and a capacitor.

When the wireless power transmitter 100 transfers power according to the inductive coupling method, a magnetic field having a specific vibration frequency is formed by alternating current power in the power transmission unit 110. If a resonance phenomenon occurs in the wireless power receiver 200 by the formed magnetic field, then power is generated by the resonance phenomenon in the wireless power receiver 200.

The resonant frequency may be determined by the following formula in Equation 1.

$$f = \frac{1}{2\pi\sqrt{LC}} \quad \text{[Equation 1]}$$

Here, the resonant frequency (f) is determined by an inductance (L) and a capacitance (C) in a circuit. In a circuit forming a magnetic field using a coil, the inductance can be determined by a number of turns of the coil, and the like, and the capacitance can be determined by a gap between the coils, an area, and the like. In addition to the coil, a capacitive resonant circuit may be configured to be connected thereto to determine the resonant frequency.

Referring to FIG. 6, when power is transmitted in a wireless manner according to the resonance coupling method, the power conversion unit 111 of the wireless power transmitter 100 may include a transmitting (Tx) coil 1111b in which a magnetic field is formed and a resonant circuit 1116 connected to the transmitting coil 1111b to determine a specific vibration frequency. The resonant circuit 1116 may be implemented by using a capacitive circuit (capacitors), and the specific vibration frequency may be determined based on an inductance of the transmitting coil 1111b and a capacitance of the resonant circuit 1116.

The configuration of a circuit element of the resonant circuit 1116 may be implemented in various forms such that the power conversion unit 111 forms a magnetic field, and is not limited to a form of being connected in parallel to the transmitting coil 1111b as illustrated in FIG. 6.

Furthermore, the power receiving unit 291 of the wireless power receiver 200 may include a resonant circuit 2912 and a receiving (Rx) coil 2911b to generate a resonance phenomenon by a magnetic field formed in the wireless power transmitter 100. In other words, the resonant circuit 2912 may be also implemented by using a capacitive circuit, and the resonant circuit 2912 is configured such that a resonant frequency determined based on an inductance of the receiving coil 2911b and a capacitance of the resonant circuit 2912 has the same frequency as a resonant frequency of the formed magnetic field.

The configuration of a circuit element of the resonant circuit 2912 may be implemented in various forms such that the power receiving unit 291 generates resonance by a magnetic field, and is not limited to a form of being connected in series to the receiving coil 2911b as illustrated in FIG. 6.

The specific vibration frequency in the wireless power transmitter 100 may have LTX, CTX, and may be acquired by using the Equation 1. Here, the wireless power receiver 200 generates resonance when a result of substituting the LRX and CRX of the wireless power receiver 200 to the Equation 1 is same as the specific vibration frequency.

As a result, an efficiency of contactless power transfer by the resonance coupling method is greatly affected by a frequency characteristic, whereas the effect of an alignment and distance between the wireless power transmitter 100 and the wireless power receiver 200 including each coil is relatively smaller than the inductive coupling method.

Hereinafter, the configuration of a wireless power transmitter and an electronic device in the resonance coupling method applicable to the embodiments disclosed herein will be described in detail.

Wireless Power Transmitter in Resonance Coupling Method

Figure 7A:
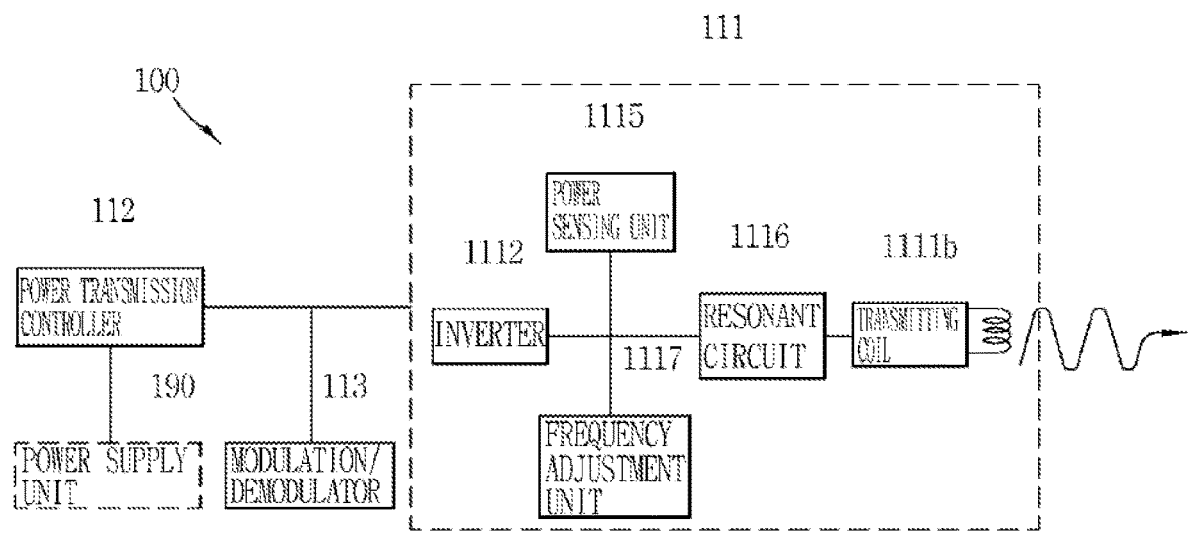
FIGS. 7A and 7B are block diagrams illustrating part of the wireless power transmitter and wireless power receiver in a resonance method that can be employed in the embodiments disclosed herein.
Figure 7B:
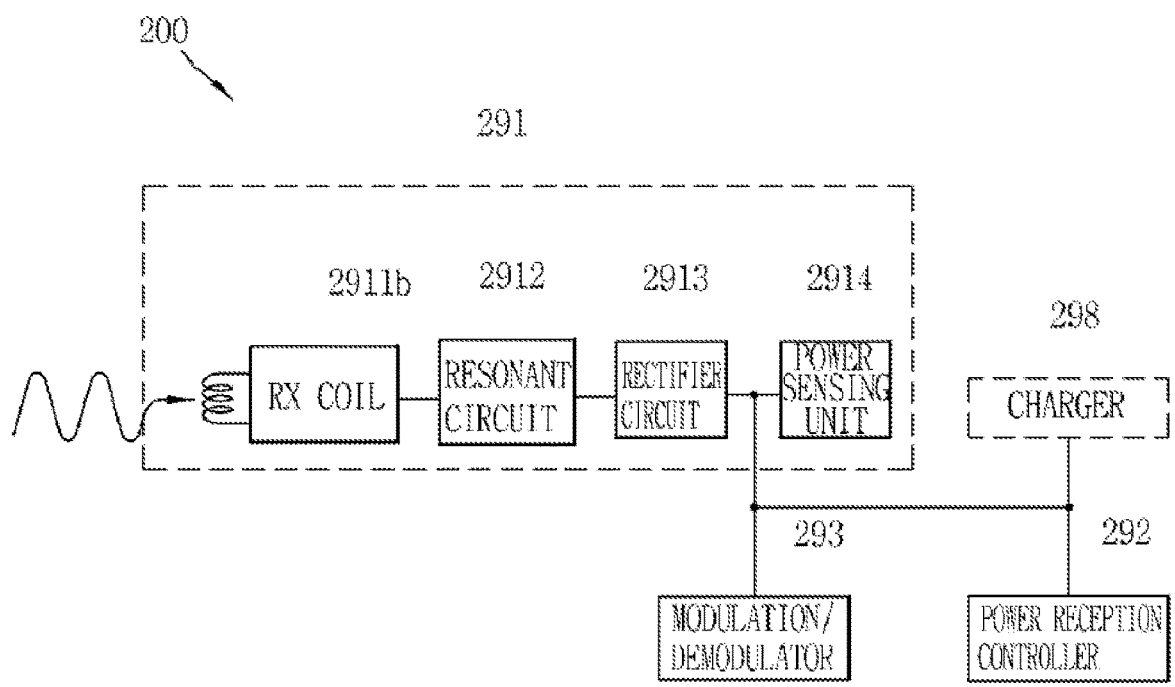

FIGS. 7A and 7B are a block diagram illustrating part of the wireless power transmitter 100 and wireless power receiver 200 in a resonance method that can be employed in the embodiments disclosed herein.

A configuration of the power transmission unit 110 included in the wireless power transmitter 100 will be described with reference to FIG. 7A.

The power conversion unit 111 of the wireless power transmitter 100 may include a transmitting (Tx) coil 1111b, an inverter 1112, and a resonant circuit 1116. The inverter 1112 may be configured to be connected to the transmitting coil 1111b and the resonant circuit 1116.

The transmitting coil 1111b may be mounted separately from the transmitting coil 1111a for transferring power according to the inductive coupling method, but may transfer power in the inductive coupling method and resonance coupling method using one single coil.

The transmitting coil 1111b, as described above, forms a magnetic field for transferring power. The transmitting coil 1111b and the resonant circuit 1116 generate resonance when alternating current power is applied thereto, and at this time, a vibration frequency may be determined based on an inductance of the transmitting coil 1111b and a capacitance of the resonant circuit 1116.

For this purpose, the inverter 1112 transforms a DC input obtained from the power supply unit 190 into an AC waveform, and the transformed AC current is applied to the transmitting coil 1111b and the resonant circuit 1116.

In addition, the power conversion unit 111 may further include a frequency adjustment unit 1117 for changing a resonant frequency of the power conversion unit 111. The resonant frequency of the power conversion unit 111 is determined based on an inductance and/or capacitance within a circuit constituting the power conversion unit 111 by Equation 1, and thus the power transmission control unit 112 may determine the resonant frequency of the power conversion unit 111 by controlling the frequency adjustment unit 1117 to change the inductance and/or capacitance.

The frequency adjustment unit 1117, for example, may be configured to include a motor for adjusting a distance between capacitors included in the resonant circuit 1116 to change a capacitance, or include a motor for adjusting a number of turns or diameter of the transmitting coil 1111b to change an inductance, or include active elements for determining the capacitance and/or inductance On the other hand, the power conversion unit 111 may further include a power sensing unit 1115. The operation of the power sensing unit 1115 is the same as the foregoing description.

Referring to FIG. 7B, a configuration of the power supply unit 290 included in the wireless power receiver 200 will be described. The power supply unit 290, as described above, may include the receiving (Rx) coil 2911b and resonant circuit 2912.

In addition, the power receiving unit 291 of the power supply unit 290 may further include a rectifier 2913 for converting an AC current generated by resonance phenomenon into DC. The rectifier 2913 may be configured similarly to the foregoing description.

Furthermore, the power receiving unit 291 may further include a power sensing unit 2914 for monitoring a voltage and/or current of the rectified power. The power sensing unit 2914 may be configured similarly to the foregoing description.

Wireless Power Transmitter Configured to Include One or More Transmitting Coils

Figure 8:
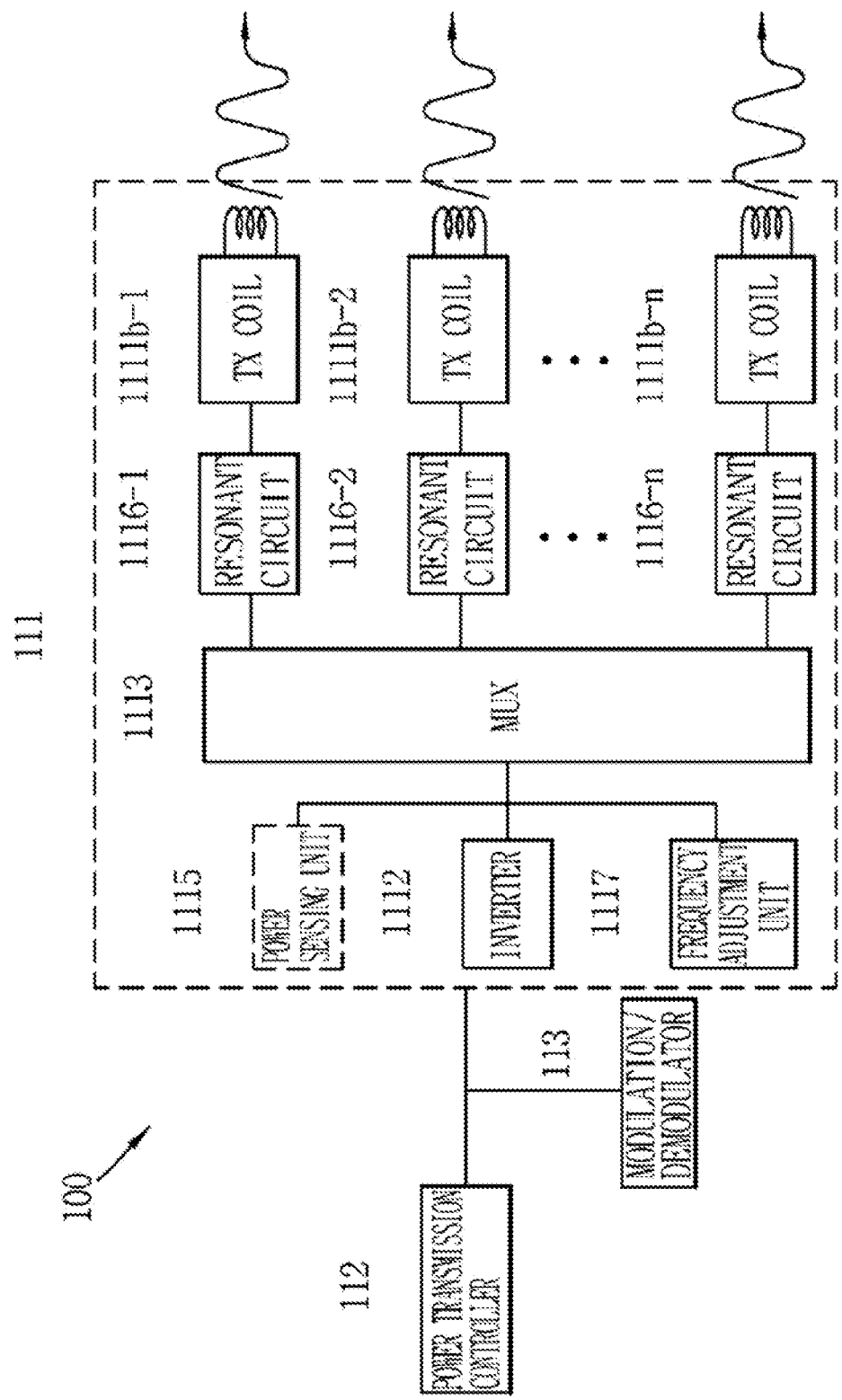
FIG. 8 is a block diagram illustrating a wireless power transmitter configured to have one or more transmitting coils receiving power according to a resonance coupling method that can be employed in the embodiments disclosed herein.

FIG. 8 is a block diagram illustrating a wireless power transmitter configured to have one or more transmission coils receiving power according to a resonance coupling method that can be employed in the embodiments disclosed herein.

Referring to FIG. 8, the power conversion unit 111 of the wireless power transmitter 100 according to the embodiments disclosed herein may include one or more transmitting coils 1111b-1 to 1111b-n and resonant circuits (1116-1 to 1116-n) connected to each transmitting coils. Furthermore, the power conversion unit 111 may further include a multiplexer 1113 for establishing and releasing the connection of some of the one or more transmitting coils 1111b-1 to 1111b-n.

The one or more transmitting coils 1111b-1 to 1111b-n may be configured to have the same vibration frequency, or some of them may be configured to have different vibration frequencies. It is determined by an inductance and/or capacitance of the resonant circuits (1116-1 to 1116-n) connected to the one or more transmitting coils 1111b-1 to 1111b-n, respectively.

For this purpose, the frequency adjustment unit 1117 may be configured to change an inductance and/or capacitance of the resonant circuits (1116-1 to 1116-n) connected to the one or more transmitting coils 1111b-1 to 1111b-n, respectively.

In-Band Communication

Figure 9:
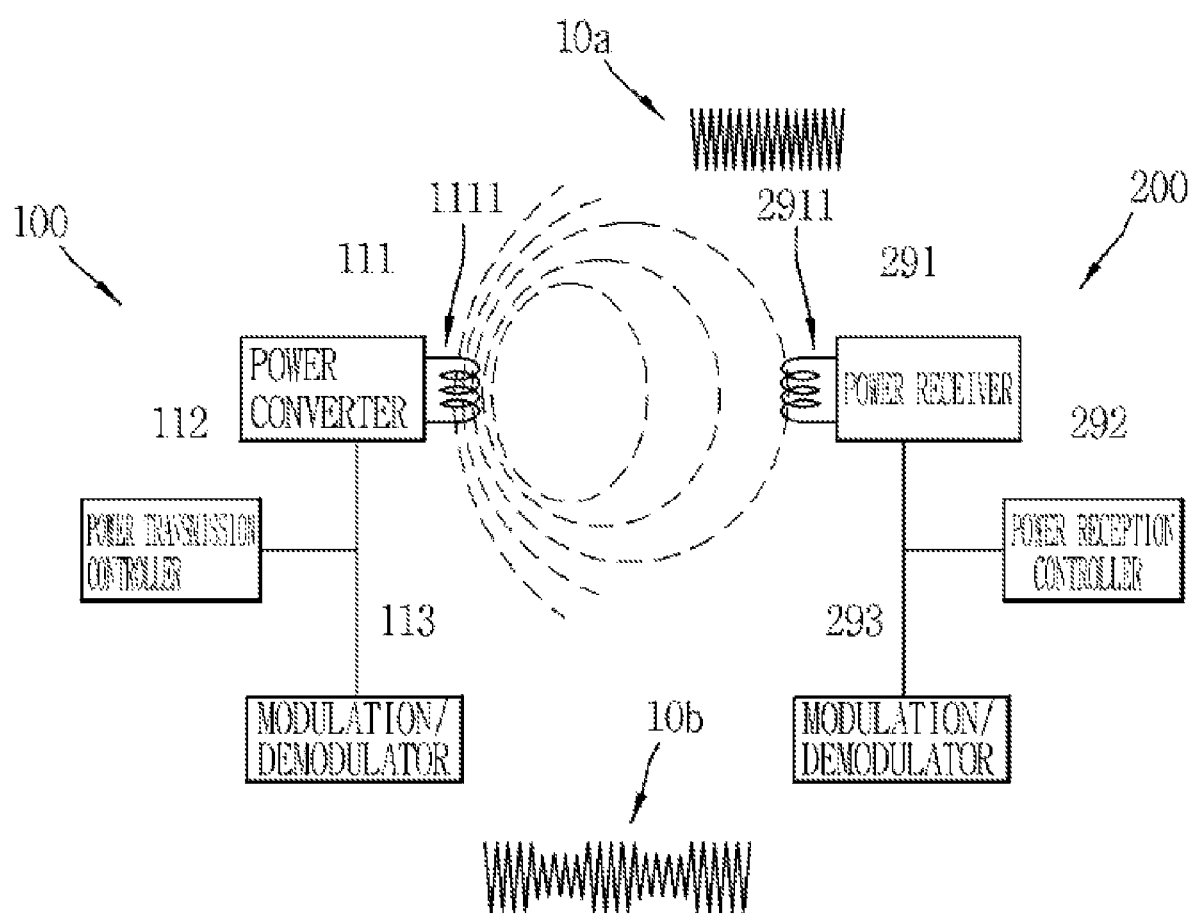
FIG. 9 a view illustrating a concept of transmitting and receiving a packet between a wireless power transmitter and an electronic device through the modulation and demodulation of a wireless power signal in transferring power in a wireless manner disclosed herein.

FIG. 9 a view illustrating the concept of transmitting and receiving a packet between a wireless power transmitter and a wireless power receiver through the modulation and demodulation of a wireless power signal in transferring power in a wireless manner disclosed herein.

As illustrated in FIG. 9, the power conversion unit 111 included in the wireless power transmitter 100 may generate a wireless power signal. The wireless power signal may be generated through the transmitting coil 1111 included in the power conversion unit 111.

The wireless power signal 10a generated by the power conversion unit 111 may arrive at the wireless power receiver 200 so as to be received through the power receiving unit 291 of the wireless power receiver 200. The generated wireless power signal may be received through the receiving coil 2911 included in the power receiving unit 291.

The power reception control unit 292 may control the modulation/demodulation unit 293 connected to the power receiving unit 291 to modulate the wireless power signal while the wireless power receiver 200 receives the wireless power signal. When the received wireless power signal is modulated, the wireless power signal may form a closed-loop within a magnetic field or an electro-magnetic field. This may allow the wireless power transmitter 100 to sense a modulated wireless power signal 10b. The modulation/demodulation unit 113 may demodulate the sensed wireless power signal and decode the packet from the demodulated wireless power signal.

The modulation method employed for the communication between the wireless power transmitter 100 and the wireless power receiver 200 may be an amplitude modulation. As aforementioned, the amplitude modulation is a backscatter modulation may be a backscatter modulation method in which the power communications modulation/demodulation unit 293 at the side of the wireless power receiver 200 changes an amplitude of the wireless power signal 10a formed by the power conversion unit 111 and the power reception control unit 292 at the side of the wireless power transmitter 100 detects an amplitude of the modulated wireless power signal 10b.

Modulation and Demodulation of Wireless Power Signal

Hereinafter, description will be given of modulation and demodulation of a packet, which is transmitted or received between the wireless power transmitter 100 and the wireless power receiver 200 with reference to FIGS. 10 and 11.

Figure 10:
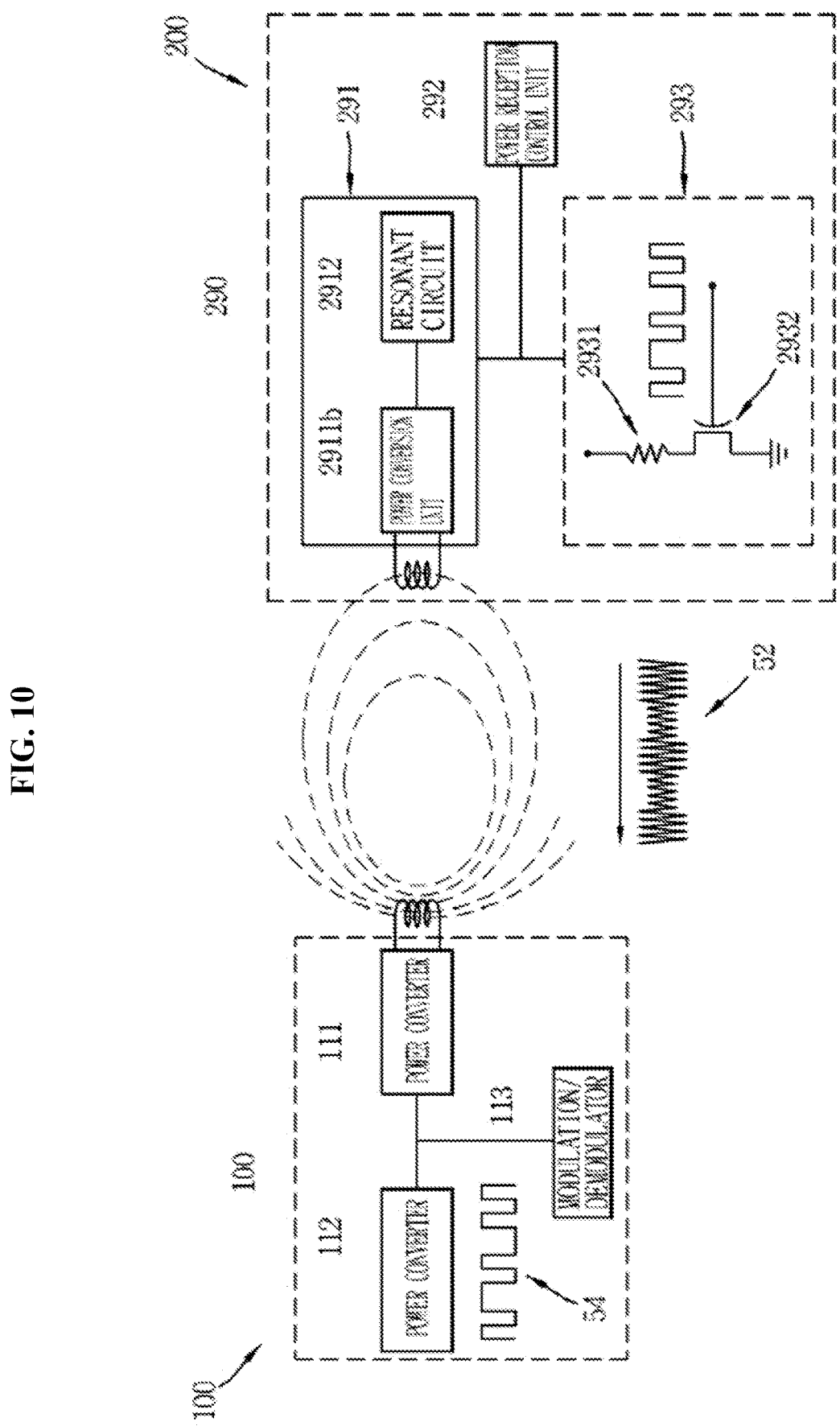
FIG. 10 is a view illustrating a configuration of transmitting and receiving a power control message in transferring power in a wireless manner disclosed herein'
Figure 11A:
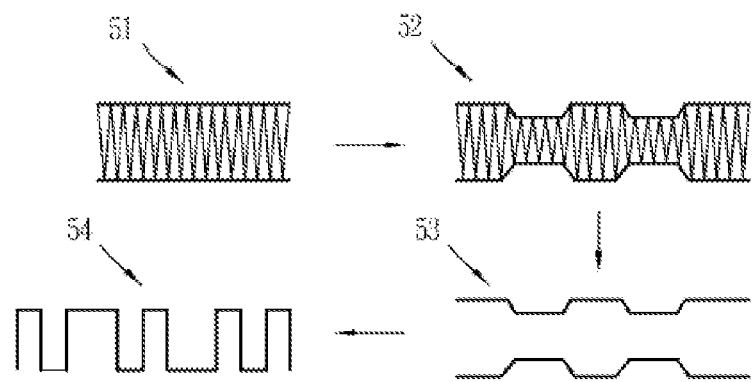
FIGS. 11A, 11B and 11C are views illustrating forms of signals upon modulation and demodulation executed in a wireless power transfer disclosed herein.
Figure 11B:
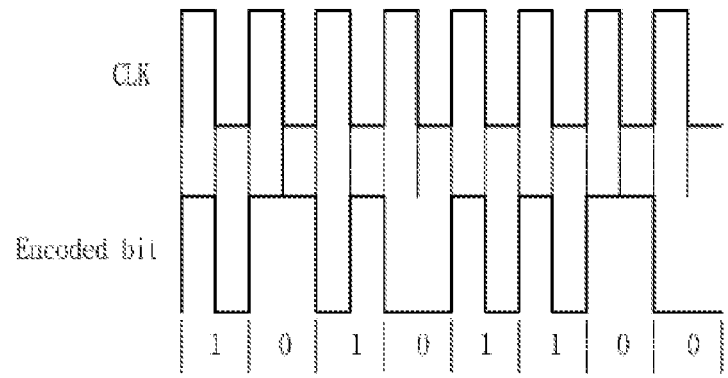
Figure 11C:
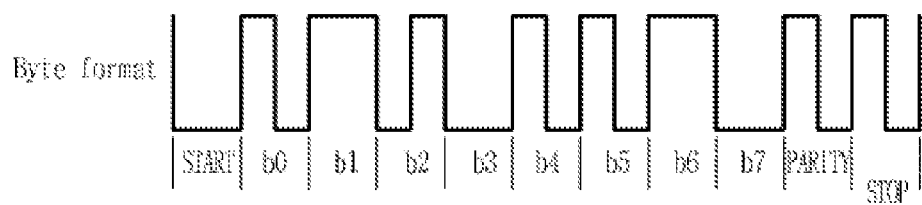
Figure 12A:
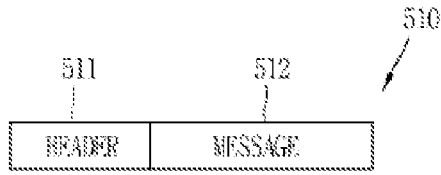
FIGS. 12A, 12B and 12C are views illustrating a packet including a power control message used in a contactless (wireless) power transfer method according to the embodiments disclosed herein.
Figure 12B:
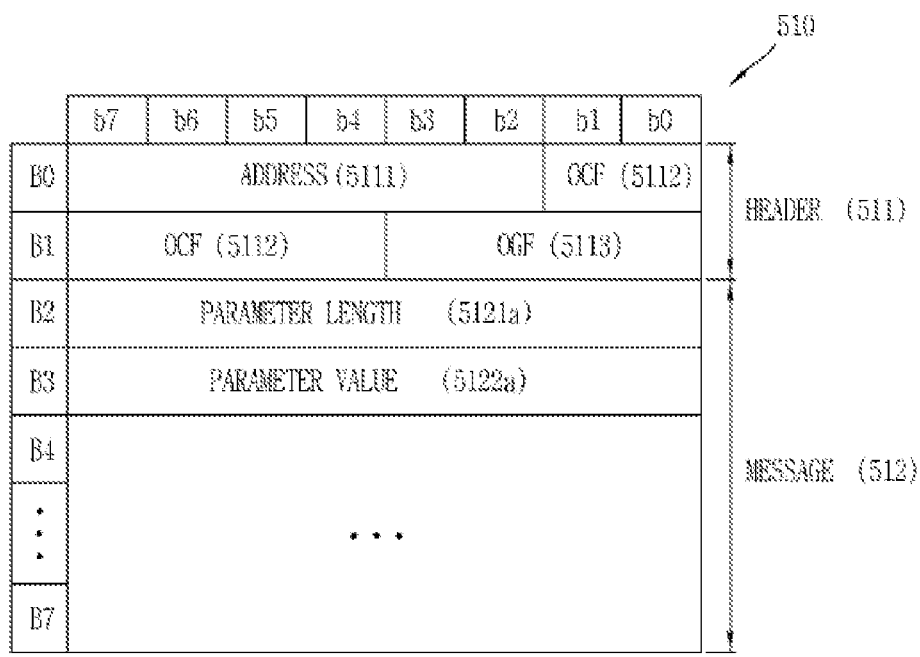
Figure 12C:
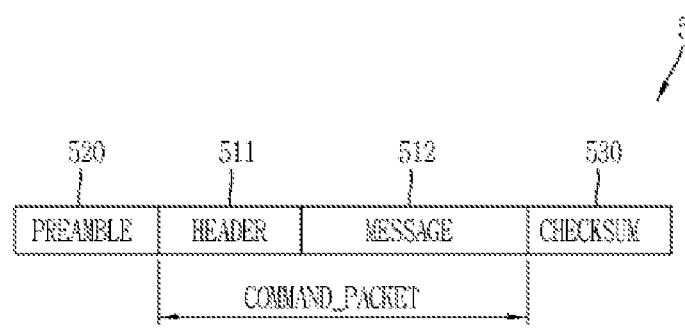

FIG. 10 is a view illustrating a configuration of transmitting or receiving a power control message in transferring power in a wireless manner disclosed herein, and FIGS. 11A, 11B and 11C are a view illustrating forms of signals upon modulation and demodulation executed in the wireless power transfer disclosed herein. FIGS. 12A, 12B and 12C are a view illustrating a packet including a power control message used in a contactless (wireless) power transfer method according to the embodiments disclosed herein.

Referring to FIG. 10, the wireless power signal received through the power receiving unit 291 of the wireless power receiver 200, as illustrated in FIG. 11A, may be a non-modulated wireless power signal 51. The wireless power receiver 200 and the wireless power transmitter 100 may establish a resonance coupling according to a resonant frequency, which is set by the resonant circuit 2912 within the power receiving unit 291, and the wireless power signal 51 may be received through the receiving coil 2911b.

The power reception control unit 292 may modulate the wireless power signal 51 received through the power receiving unit 291 by changing a load impedance within the modulation/demodulation unit 293. The modulation/demodulation unit 293 may include a passive element 2931 and an active element 2932 for modulating the wireless power signal 51. The modulation/demodulation unit 293 may modulate the wireless power signal 51 to include a packet, which is desired to be transmitted to the wireless power transmitter 100. Here, the packet may be input into the active element 2932 within the modulation/demodulation unit 293.

Afterwards, the power transmission control unit 112 of the wireless power transmitter 100 may demodulate a modulated wireless power signal 52 through an envelop detection, and decode the detected signal 53 into digital data 54. The demodulation may detect a current or voltage flowing into the power conversion unit 111 to be classified into two states, a HI phase and a LO phase, and acquire a packet to be transmitted by the wireless power receiver 200 based on digital data classified according to the states.

Hereinafter, a process of allowing the wireless power transmitter 100 to acquire a power control message to be transmitted by the wireless power receiver 200 from the demodulated digital data will be described.

Referring to FIG. 11B, the power transmission control unit 112 detects an encoded bit using a clock signal (CLK) from an envelope detected signal. The detected encoded bit is encoded according to a bit encoding method used in the modulation process at the side of the wireless power receiver 200. The bit encoding method may correspond to any one of non-return to zero (NRZ) and bi-phase encoding.

For instance, the detected bit may be a differential bi-phase (DBP) encoded bit. According to the DBP encoding, the power reception control unit 292 at the side of the wireless power receiver 200 is allowed to have two state transitions to encode data bit 1, and to have one state transition to encode data bit 0. In other words, data bit 1 may be encoded in such a manner that a transition between the HI state and LO state is generated at a rising edge and falling edge of the clock signal, and data bit 0 may be encoded in such a manner that a transition between the HI state and LO state is generated at a rising edge of the clock signal.

On the other hand, the power transmission control unit 112 may acquire data in a byte unit using a byte format constituting a packet from a bit string detected according to the bit encoding method. For instance, the detected bit string may be transferred by using an 11-bit asynchronous serial format as illustrated in FIG. 11C. In other words, the detected bit may include a start bit indicating the beginning of a byte and a stop bit indicating the end of a byte, and also include data bits (b0 to b7) between the start bit and the stop bit. Furthermore, it may further include a parity bit for checking an error of data. The data in a byte unit constitutes a packet including a power control message.

[For Supporting In-Band Two-Way Communication]

As aforementioned, FIG. 9 has illustrated that the wireless power receiver 200 transmits a packet using a carrier signal 10a formed by the wireless power transmitter 100. However, the wireless power transmitter 100 may also transmit data to the wireless power receiver 200 by a similar method.

That is, the power transmission control unit 112 may control the modulation/demodulation unit 113 to modulate data, which is to be transmitted to the wireless power receiver 200, such that the data can be included in the carrier signal 10a. Here, the power reception control unit 292 of the wireless power receiver 200 may control the modulation/demodulation unit 293 to execute demodulation so as to acquire data from the modulated carrier signal 10a.

Packet Format

Hereinafter, description will be given of a structure of a packet used in communication using a wireless power signal according to the exemplary embodiments disclosed herein.

FIGS. 12A, 12B and 12C are views illustrating a packet including a power control message used in a contactless (wireless) power transfer method according to the embodiments disclosed herein.

As illustrated in FIG. 12A, the wireless power transmitter 100 and the wireless power receiver 200 may transmit and receive data desired to transmit in a form of a command packet (command_packet) 510. The command packet 510 may include a header 511 and a message 512.

The header 511 may include a field indicating a type of data included in the message 512. Size and type of the message may be decided based on a value of the field which indicates the type of data.

The header 511 may include an address field for identifying a transmitter (originator) of the packet. For example, the address field may indicate an identifier of the wireless power receiver 200 or an identifier of a group to which the wireless power receiver 200 belongs. When the wireless power receiver 200 transmits the packet 510, the wireless power receiver 200 may generate the packet 510 such that the address field can indicate identification information related to the receiver 200 itself.

The message 512 may include data that the originator of the packet 510 desires to transmit. The data included in the message 512 may be a report, a request or a response for the other party.

According to one exemplary embodiment, the command packet 510 may be configured as illustrated in FIG. 12B. The header 511 included in the command packet 510 may be represented with a predetermined size. For example, the header 511 may have a 2-byte size.

The header 511 may include a reception address field. For example, the reception address field may have a 6-bit size.

The header 511 may include an operation command field (OCF) or an operation group field (OGF). The OGF is a value given for each group of commands for the wireless power receiver 200, and the OCF is a value given for each command existing in each group in which the wireless power receiver 200 is included.

The message 512 may be divided into a length field 5121 of a parameter and a value field 5122 of the parameter. That is, the originator of the packet 510 may generate the message by a length-value pair (5121a-5122a, etc.) of at least one parameter, which is required to represent data desired to transmit.

Referring to FIG. 12C, the wireless power transmitter 100 and the wireless power receiver 200 may transmit and receive the data in a form of a packet which further has a preamble 520 and a checksum 530 added to the command packet 510.

The preamble 520 may be used to perform synchronization with data received by the wireless power transmitter 100 and detect the start bit of the header 520. The preamble 520 may be configured to repeat the same bit. For instance, the preamble 520 may be configured such that data bit 1 according to the DBP encoding is repeated eleven to twenty five times.

The checksum 530 may be used to detect an error that can be occurred in the command packet 510 while transmitting a power control message.

Operation Phases

Hereinafter, description will be given of operation phases of the wireless power transmitter 100 and the wireless power receiver 200.

Figure 13:
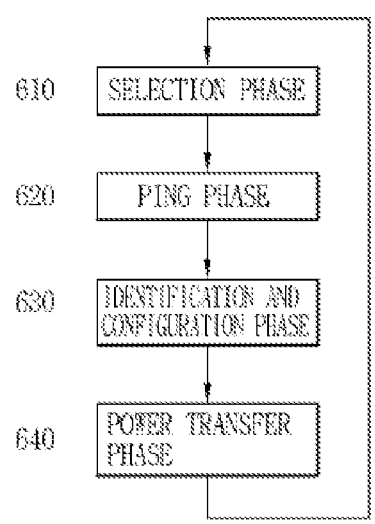
FIG. 13 is a view illustrating operation phases of the wireless power transmitter and wireless power receiver according to the embodiments disclosed herein.

FIG. 13 illustrates the operation phases of the wireless power transmitter 100 and the wireless power receiver 200 according to the embodiments disclosed herein. Furthermore, FIGS. 14 to 18 illustrate the structures of packets including a power control message between the wireless power transmitter 100 and the wireless power receiver 200.

Referring to FIG. 13, the operation phases of the wireless power transmitter 100 and the wireless power receiver 200 for wireless power transfer may be divided into a selection phase (state) 610, a ping phase 620, an identification and configuration phase 630, and a power transfer phase 640.

The wireless power transmitter 100 detects whether or not objects exist within a range that the wireless power transmitter 100 can transmit power in a wireless manner in the selection state 610, and the wireless power transmitter 100 sends a detection signal to the detected object and the wireless power receiver 200 sends a response to the detection signal in the ping state 620.

Furthermore, the wireless power transmitter 100 identifies the wireless power receiver 200 selected through the previous states and acquires configuration information for power transmission in the identification and configuration state 630. The wireless power transmitter 100 transmits power to the wireless power receiver 200 while controlling power transmitted in response to a control message received from the wireless power receiver 200 in the power transfer state 640.

Hereinafter, each of the operation phases will be described in detail.

1) Selection State

The wireless power transmitter 100 in the selection state 610 performs a detection process to select the wireless power receiver 200 existing within a detection area. The detection area, as described above, refers to a region in which an object within the relevant area can affect on the characteristic of the power of the power conversion unit 111. Compared to the ping state 620, the detection process for selecting the wireless power receiver 200 in the selection state 610 is a process of detecting a change of the power amount for forming a wireless power signal in the power conversion unit at the side of the wireless power transmitter 100 to check whether any object exists within a predetermined range, instead of the scheme of receiving a response from the wireless power receiver 200 using a power control message. The detection process in the selection state 610 may be referred to as an analog ping process in the aspect of detecting an object using a wireless power signal without using a packet in a digital format in the ping state 620 which will be described later.

The wireless power transmitter 100 in the selection state 610 can detect that an object comes in or out within the detection area. Furthermore, the wireless power transmitter 100 can distinguish the wireless power receiver 200 capable of transferring power in a wireless manner from other objects (for example, a key, a coin, etc.) among objects located within the detection area.

As described above, a distance that can transmit power in a wireless manner may be different according to the inductive coupling method and resonance coupling method, and thus the detection area for detecting an object in the selection state 610 may be different from one another.

First, in case where power is transmitted according to the inductive coupling method, the wireless power transmitter 100 in the selection state 610 can monitor an interface surface (not shown) to detect the alignment and removal of objects.

Furthermore, the wireless power transmitter 100 may detect the location of the wireless power receiver 200 placed on an upper portion of the interface surface. As described above, the wireless power transmitter 100 formed to include one or more transmitting coils may perform the process of entering the ping state 620 in the selection state 610, and checking whether or not a response to the detection signal is transmitted from the object using each coil in the ping state 620 or subsequently entering the identification state 630 to check whether identification information is transmitted from the object. The wireless power transmitter 100 may determine a coil to be used for contactless power transfer based on the detected location of the wireless power receiver 200 acquired through the foregoing process.

Furthermore, when power is transmitted according to the resonance coupling method, the wireless power transmitter 100 in the selection state 610 can detect an object by detecting that any one of a frequency, a current and a voltage of the power conversion unit is changed due to an object located within the detection area.

On the other hand, the wireless power transmitter 100 in the selection state 610 may detect an object by at least any one of the detection methods using the inductive coupling method and resonance coupling method. The wireless power transmitter 100 may perform an object detection process according to each power transmission method, and subsequently select a method of detecting the object from the coupling methods for contactless power transfer to advance to other states 620, 630, 640.

On the other hand, for the wireless power transmitter 100, a wireless power signal formed to detect an object in the selection state 610 and a wireless power signal formed to perform digital detection, identification, configuration and power transmission in the subsequent states 620, 630, 640 may have a different characteristic in the frequency, strength, and the like. It is because the selection state 610 of the wireless power transmitter 100 corresponds to an idle state for detecting an object, thereby allowing the wireless power transmitter 100 to reduce consumption power in the idle state or generate a specialized signal for effectively detecting an object.

2) Ping State

The wireless power transmitter 100 in the ping state 620 performs a process of detecting the wireless power receiver 200 existing within the detection area through a power control message. Compared to the detection process of the wireless power receiver 200 using a characteristic of the wireless power signal and the like in the selection state 610, the detection process in the ping state 620 may be referred to as a digital ping process.

The wireless power transmitter 100 in the ping state 620 forms a wireless power signal to detect the wireless power receiver 200, modulates the wireless power signal modulated by the wireless power receiver 200, and acquires a power control message in a digital data format corresponding to a response to the detection signal from the modulated wireless power signal. The wireless power transmitter 100 may receive a power control message corresponding to the response to the detection signal to recognize the wireless power receiver 200 which is a subject of power transmission.

The detection signal formed to allowing the wireless power transmitter 100 in the ping state 620 to perform a digital detection process may be a wireless power signal formed by applying a power signal at a specific operating point for a predetermined period of time. The operating point may denote a frequency, duty cycle, and amplitude of the voltage applied to the transmitting (Tx) coil. The wireless power transmitter 100 may generate the detection signal generated by applying the power signal at a specific operating point for a predetermined period of time, and attempt to receive a power control message from the wireless power receiver 200.

Figure 14:
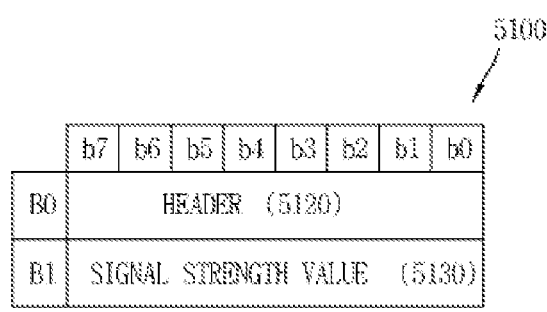
FIGS. 14 to 18 are views illustrating the structure of packets including a power control message between the wireless power transmitter 100 and the wireless power receiver.

On the other hand, the power control message corresponding to a response to the detection signal may be a message indicating strength of the wireless power signal received by the wireless power receiver 200. For example, the wireless power receiver 200 may transmit a signal strength packet 5100 including a message indicating the received strength of the wireless power signal as a response to the detection signal as illustrated in FIG. 14. The packet 5100 may include a header 5120 for notifying a packet indicating the signal strength and a message 5130 indicating strength of the power signal received by the wireless power receiver 200. The strength of the power signal within the message 5130 may be a value indicating a degree of inductive coupling or resonance coupling for power transmission between the wireless power transmitter 100 and the wireless power receiver 200.

The wireless power transmitter 100 may receive a response message to the detection signal to find the wireless power receiver 200, and then extend the digital detection process to enter the identification and configuration state 630. In other words, the wireless power transmitter 100 maintains the power signal at a specific operating point subsequent to finding the wireless power receiver 200 to receive a power control message required in the identification and configuration state 630.

However, if the wireless power transmitter 100 is not able to find the wireless power receiver 200 to which power can be transferred, then the operation phase of the wireless power transmitter 100 will be returned to the selection state 610.

3) Identification and Configuration State

The wireless power transmitter 100 in the identification and configuration state 630 may receive identification information and/or configuration information transmitted by the wireless power receiver 200, thereby controlling power transmission to be effectively carried out.

Figure 15A:
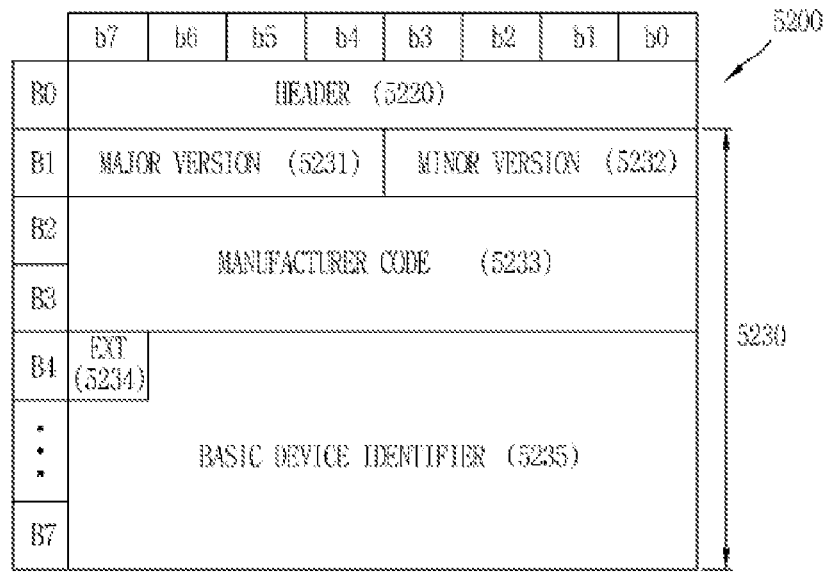
Figure 15B:
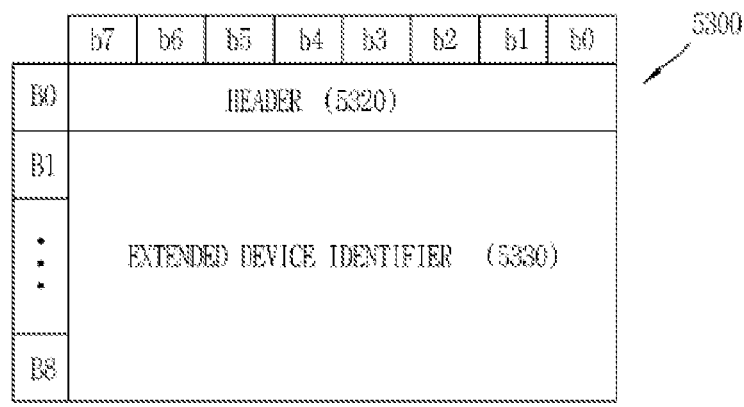

The wireless power receiver 200 in the identification and configuration state 630 may transmit a power control message including its own identification information. For this purpose, the wireless power receiver 200, for instance, may transmit an identification packet 5200 including a message indicating the identification information of the wireless power receiver 200 as illustrated in FIG. 15A. The packet 5200 may include a header 5220 for notifying a packet indicating identification information and a message 5230 including the identification information of the electronic device. The message 5230 may include information (2531 and 5232) indicating a version of the contract for contactless power transfer, information 5233 for identifying a manufacturer of the wireless power receiver 200, information 5234 indicating the presence or absence of an extended device identifier, and a basic device identifier 5235. Furthermore, if it is displayed that an extended device identifier exists in the information 5234 indicating the presence or absence of an extended device identifier, then an extended identification packet 5300 including the extended device identifier as illustrated in FIG. 15B will be transmitted in a separate manner. The packet 5300 may include a header 5320 for notifying a packet indicating an extended device identifier and a message 5330 including the extended device identifier. When the extended device identifier is used as described above, information based on the manufacturer's identification information 5233, the basic device identifier 5235 and the extended device identifier 5330 will be used to identify the wireless power receiver 200.

Figure 16:
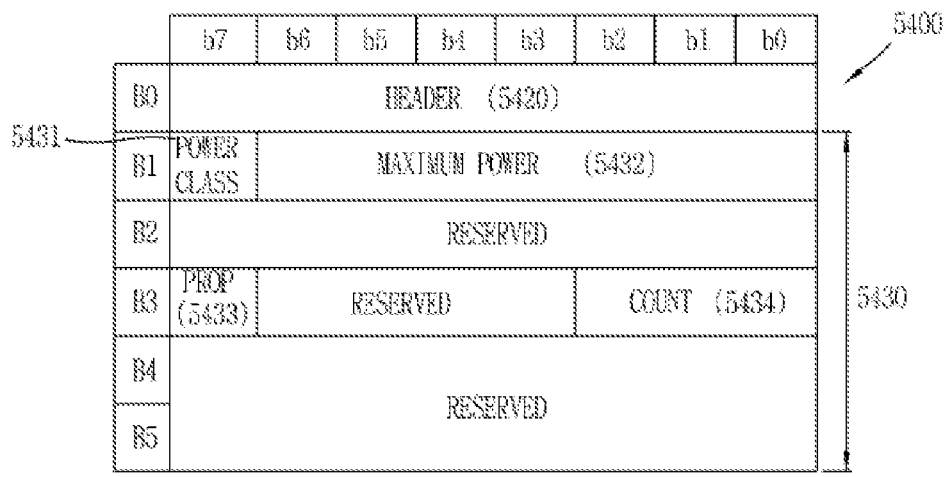

The wireless power receiver 200 may transmit a power control message including information on expected maximum power in the identification and configuration state 630. To this end, the wireless power receiver 200, for instance, may transmit a configuration packet 5400 as illustrated in FIG. 16. The packet may include a header 5420 for notifying that it is a configuration packet and a message 5430 including information on the expected maximum power. The message 5430 may include power class 5431, information 5432 on expected maximum power, an indicator 5433 indicating a method of determining a current of a main cell at the side of the wireless power transmitter, and the number 5434 of optional configuration packets. The indicator 5433 may indicate whether or not a current of the main cell at the side of the wireless power transmitter is determined as specified in the contract for wireless power transfer.

On the other hand, the wireless power transmitter 100 may generate a power transfer contract which is used for power charging with the wireless power receiver 200 based on the identification information and/or configuration information. The power transfer contract may include the limits of parameters determining a power transfer characteristic in the power transfer state 640.

The wireless power transmitter 100 may terminate the identification and configuration state 630 and return to the selection state 610 prior to entering the power transfer state 640. For instance, the wireless power transmitter 100 may terminate the identification and configuration state 630 to find another electronic device that can receive power in a wireless manner.

4) Power Transfer State

The wireless power transmitter 100 in the power transfer state 640 transmits power to the wireless power receiver 200.

Figure 17:
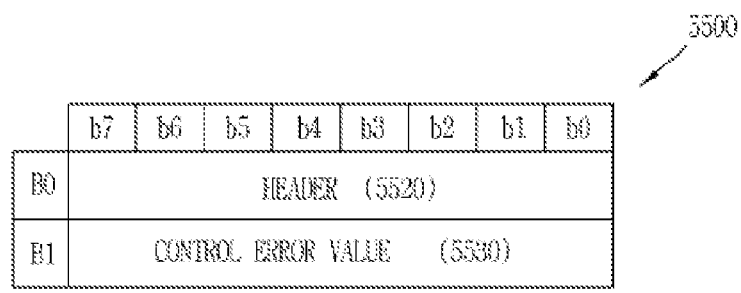

The wireless power transmitter 100 may receive a power control message from the wireless power receiver 200 while transferring power, and control a characteristic of the power applied to the transmitting coil in response to the received power control message. For example, the power control message used to control a characteristic of the power applied to the transmitting coil may be included in a control error packet 5500 as illustrated in FIG. 17. The packet 5500 may include a header 5520 for notifying that it is a control error packet and a message 5530 including a control error value. The wireless power transmitter 100 may control the power applied to the transmitting coil according to the control error value. In other words, a current applied to the transmitting coil may be controlled so as to be maintained if the control error value is "0," reduced if the control error value is a negative value, and increased if the control error value is a positive value.

The wireless power transmitter 100 may monitor parameters within a power transfer contract generated based on the identification information and/or configuration information in the power transfer state 640. As a result of monitoring the parameters, if power transmission to the wireless power receiver 200 violates the limits included in the power transfer contract, then the wireless power transmitter 100 may cancel the power transmission and return to the selection state 610.

The wireless power transmitter 100 may terminate the power transfer state 640 based on a power control message transferred from the wireless power receiver 200.

For example, if the charging of a battery has been completed while charging the battery using power transferred by the wireless power receiver 200, then a power control message for requesting the suspension of wireless power transfer will be transferred to the wireless power transmitter 100. In this case, the wireless power transmitter 100 may receive a message for requesting the suspension of the power transmission, and then terminate wireless power transfer, and return to the selection state 610.

For another example, the wireless power receiver 200 may transfer a power control message for requesting renegotiation or reconfiguration to update the previously generated power transfer contract. The wireless power receiver 200 may transfer a message for requesting the renegotiation of the power transfer contract when it is required a larger or smaller amount of power than the currently transmitted power amount. In this case, the wireless power transmitter 100 may receive a message for requesting the renegotiation of the power transfer contract, and then terminate contactless power transfer, and return to the identification and configuration state 630.

Figure 18:
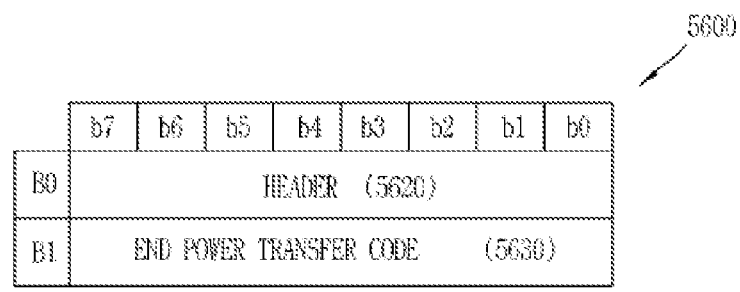

To this end, a message transmitted by the wireless power receiver 200, for instance, may be an end power transfer packet 5600 as illustrated in FIG. 18. The packet 5600 may include a header 5620 for notifying that it is an end power transfer packet and a message 5630 including an end power transfer code indicating the cause of the suspension. The end power transfer code may indicate any one of charge complete, internal fault, over temperature, over voltage, over current, battery failure, reconfigure, no response, and unknown error.

Communication Method of Plural Electronic Devices

Hereinafter, description will be given of a method by which at least one electronic device performs communication with one wireless power transmitter using wireless power signals.

Figure 19:
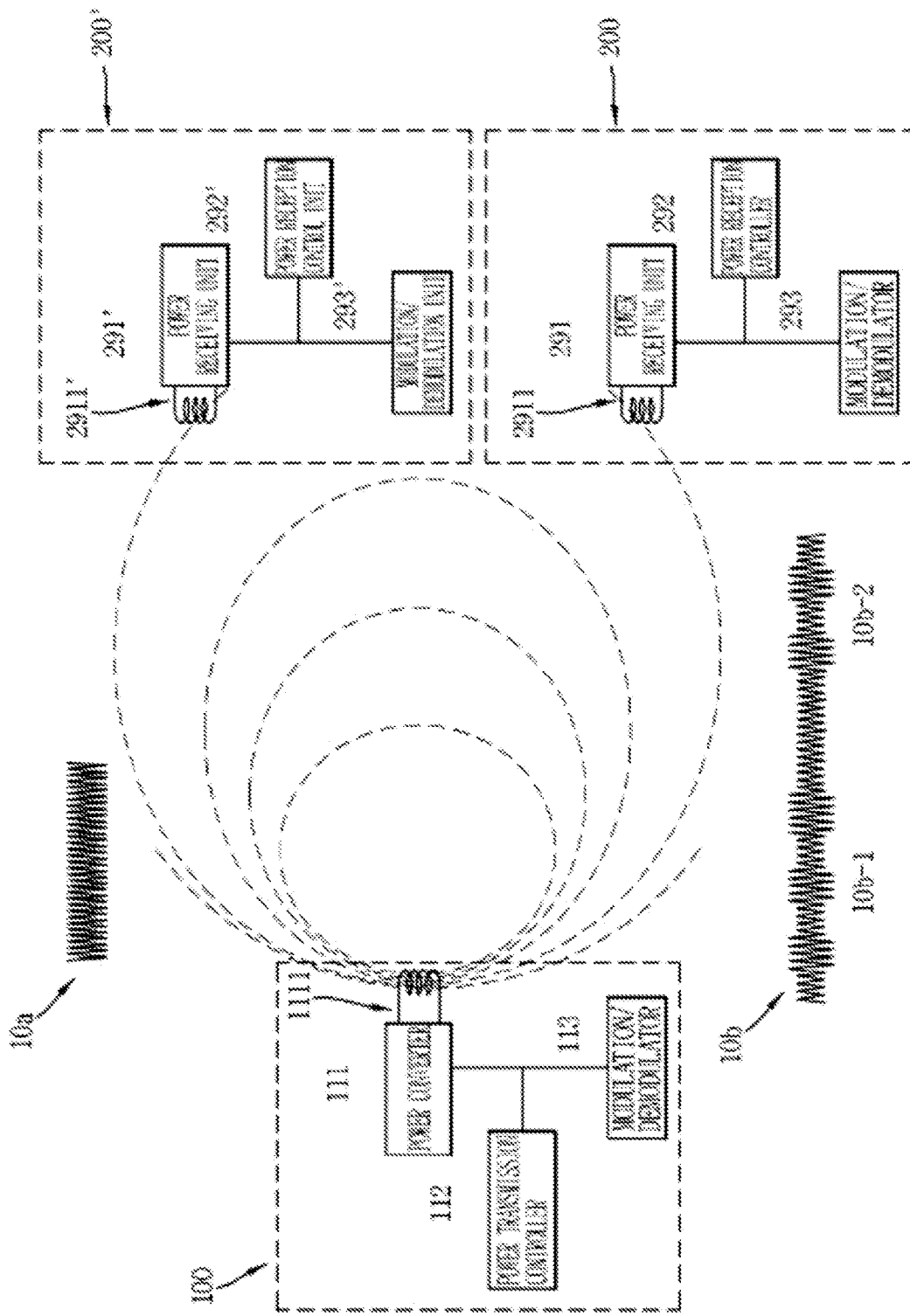
FIG. 19 is a conceptual view illustrating a method of transferring power to at least one wireless power receiver from a wireless power transmitter.

FIG. 19 is a conceptual view illustrating a method of transferring power to at least one wireless power receiver from a wireless power transmitter.

The wireless power transmitter 100 may transmit power to one or more wireless power receivers 200 and 200'. FIG. 19 illustrates two electronic devices 200 and 200', but the methods according to the exemplary embodiments disclosed herein may not be limited to the number of electronic devices shown.

An active area and a detection area may be different according to the wireless power transfer method of the wireless power transmitter 100. Therefore, the wireless power transmitter 100 may determine whether there is a wireless power receiver located on the active area or the detection area according to the resonance coupling method or a wireless power receiver located on the active area or the detection area according to the induction coupling method. According to the determination result, the wireless power transmitter 100 which supports each wireless power transfer method may change the power transfer method for each wireless power receiver.

In the wireless power transfer according to the exemplary embodiments disclosed herein, when the wireless power transmitter 100 transfers power to the one or more electronic devices 200 and 200' according to the same wireless power transfer method, the electronic devices 200 and 200' may perform communications through the wireless power signals without inter-collision.

Referring to FIG. 19, a wireless power signal 10a generated by the wireless power transmitter 100 may arrive at the first electronic device 200' and the second electronic device 200, respectively. The first and second electronic devices 200' and 200 may transmit wireless power messages using the generated wireless power signal 10a.

The first electronic device 200' and the second electronic device 200 may operate as wireless power receivers for receiving a wireless power signal. The wireless power receiver in accordance with the exemplary embodiments disclosed herein may include a power receiving unit 291', 291 to receive the generated wireless power signal, a modulation/demodulation unit 293', 293 to modulate or demodulate the received wireless power signal, and a controller 292', 292 to control each component of the wireless power receiver.

Hereinafter, a wireless power transmitter performing many-to-one communication, a method of controlling the wireless power transmitter performing many-to-one communication, and a wireless charging system (or wireless power transmission system) performing many-to-one communication will be described in more details with reference to the drawings.

FIGS. 20A and 20B are views showing frame structures for performing communication according to the present invention.

FIG. 21 illustrates a sync pattern according to the present invention.

A wireless power transmitter according to an exemplary embodiment of the present invention may transmit power wirelessly through a power converter 111. The wireless power transmitter may transmit power by at least either inductive coupling or resonant coupling.

The power converter 111 of the wireless power transmitter may consist of a coil or multiple coils. A wireless power transmitter that performs a communication method to be described below is applicable to both a power converter 111 consisting of a coil and a power converter consisting of multiple coils.

The power converter 111 may transmit a wireless power signal to perform communication between the wireless power transmitter and a wireless power receiver 200. More specifically, a wireless power signal generated by the power converter 111 may be modulated and demodulated through a modulator/demodulator 113 and transmitted in a packet to the wireless power receiver. An explanation of the method of modulation and demodulation can be substituted with the foregoing explanation of FIG. 9.

The wireless power transmitter may communicate with one wireless power receiver or multiple wireless power receivers.

Communication with one wireless power receiver can be defined as exclusive mode, and communication with one or more wireless communication receivers can be defined as shared mode. The exclusive mode may have a magnetic field coupling coefficient of 0.3 or greater, and the shared mode may have a magnetic field coupling coefficient of 0.1 or less.

If the wireless power receiver 200 is located within a functional area where the functions of the wireless power transmitter are performed, the wireless power receiver 200 may receive a power signal from the wireless power transmitter. In this case, the wireless power receiver 200 may start operating in the selection phase, based on the wireless power signal.

In the selection phase, the wireless power receiver 200 may operate in either the exclusive mode or the shared mode, depending on the presence of a particular signal within the wireless power signal received from the wireless power transmitter. The particular signal may be FSK (frequency shift keying). The FSK signal may be a signal for providing synchronization information and other information to the wireless power receiver.

More specifically, the wireless power receiver 200 may start operating in the selection phase, and then detect the presence of an FSK signal within the wireless power signal. If the wireless power receiver 200 detects the FSK signal before the elapse of a predetermined period of time from the receipt of the wireless power signal, the wireless power receiver 200 may enter the introduction phase of the shared mode. The predetermined period of time refers to the time for which the detection phase (digital ping) of the exclusive mode lasts, for example, 65 ms.

On the contrary, if the wireless power receiver 200 has not detected the FSK signal, the wireless power receiver 200 may operate in the exclusive mode. In this case, the wireless power receiver 200 may implement the operation phases explained with reference to FIG. 13.

Hereinafter, a method for the wireless power receiver 200 to perform the shared mode will be described more concretely in conjunction with the drawings.

As shown in FIGS. 20A and 20B, when the wireless power receiver operates in the shared mode, the wireless power transmitter may provide multiple slots (or time slots) to perform communication with one or more wireless power receivers. The slots may have a length suitable for the transmission of data packets.

The multiple slots each may have a fixed length.

The wireless power transmitter may transmit a sync pattern to the wireless power receiver, between two consecutive slots.

The sync pattern may be transmitted to the wireless power receiver to separate between the consecutive slots. Also, the sync pattern may optimize communication between the wireless power transmitter and the wireless power receiver. For example, the sync pattern may optimize communication by providing the wireless power receiver with information on collisions and standby time. Such a sync pattern may be referred to as a slot sync.

The multiple slots may form a fixed-length frame structure. That is, the frame may consist of multiple slots.

A frame may refer to a communication unit for transmitting and receiving information during power transmission. The frame may be of a predetermined length. For example, each frame may be 1 second (1,000 ms) long.

That is, the wireless power transmitter may perform communication in frames. That is, the wireless power transmitter 100 may perform communication in a first frame for 1 second and then in a second frame for the next second.

A frame may start with a sync pattern. That is, the sync pattern may exist between two frames and separate between the frames. Also, the sync pattern may be at the foremost part of the frame and indicate the start of the frame. That is, the wireless power receiver may detect the start of a frame through a sync pattern received from the wireless power transmitter. In this case, the start bit of the sync pattern may indicate the start of the frame. Such a sync pattern may be referred to as a frame sync.

The frame may consist of slots of a predetermined time length (for example, 50 ms), following the sync pattern. A slot following the sync pattern may be referred to as a measurement slot (or measurement window). The measurement slot may be a slot in which communication between the wireless power transmitter and the wireless power receiver is not performed, that is to say, a communication-free slot, in order to facilitate power measurement between the wireless power transmitter and the wireless power receiver.

More specifically, the wireless power transmitter may determine the amount of power transmitted to the wireless power receiver, within the measurement slot. Moreover, each wireless power receiver may calculate the amount of power received from the wireless power transmitter, within the measurement slot.

That is, through the measurement slot, the wireless power transmitter may recognize the amount of power transmitted to the wireless power receiver and determine the amount of power expected to be transmitted.

A frame in the shared mode to be described below may have a sync pattern indicating the start of the frame and a measurement slot.

The frame may have a variety of configurations. The number of slots in a frame, the length of the slots, the length of the frame, etc. may be altered depending on the frame configuration by the designer.

For example, the frame may comprise multiple slots or not. Also, the frame may have a sync pattern between two consecutive slots or not. For example, the frame may consist of 10 slots and 10 sync patterns, all of which are equal in time length. In another example, the frame may consist of 8 slots and 1 sync pattern, all of which are equal in time length. In this case, the frame may have 1 sync pattern indicating the start of the frame, but with no sync pattern between two consecutive slots.

On the other hand, in the shared mode, different types of frames may be used. For example, in the shared mode, a slotted frame having multiple slots or a free-format frame may be used.

The slotted frame may be a frame in which short data packets are transmitted to the wireless power transmitter from the wireless power receiver, whereas the free-format frame may be a frame in which long data packets can be transmitted because it has no multiple slots.

The slotted frame and the free-format frame could be called by different names by those skilled in the art. For example, the slotted frame may be called "channel frame", and the free-format frame may be called "message frame".

The wireless power transmitter may provide either the slotted frame or the free-format frame, based on a data packet received from the wireless power receiver. For example, if free-format frame request information is contained in a specific request packet received from the wireless power receiver, the wireless power transmitter may provide the next frame as a free-format frame.

The slotted frame structure may be described more concretely with reference to FIG. 20A. The slotted frame may comprise a frame sync indicating the start of the frame, a measurement slot for power measurement, 9 slots following the measurement slot, and slot syncs of equal time length respectively preceding the 9 slots. Each slot sync may be a sync pattern that is present between neighboring slots (i.e., two consecutive slots positioned on either side of the sync pattern) and contains information regarding the neighboring slots.

That is, referring to FIG. 20A, a slot sync may be positioned between each two consecutive ones of the 9 slots. In this case, the slot sync may provide information regarding the two consecutive slots.

The information regarding the neighboring slots may be information on errors in communication performed through the neighboring slots between the wireless power transmitter and the wireless power receiver, status information of the neighboring slots, and so on.

The 9 slots and the sync patterns respectively preceding the 9 slots may be of equal time length. For example, referring to FIG. 20A, the 9 slots may be 50 ms long each. The 9 sync patterns also may be 50 ms long each. This allows the wireless power receiver to get the status information of each slot and properly communicate with the wireless power transmitter.

The multiple slots constituting the slotted frame may be provided to perform communication between one wireless power transmitter and one or more wireless power receivers.

The multiple slots may consist of at least one of the following types of slot: allocated slot, free slot, and locked slot.

The allocated slot may be a type of slot that is exclusively used by a particular wireless power receiver. For example, the allocated slot may be a slot that is configured to receive a control information (CI) packet from a particular wireless power receiver.

In this case, other wireless power receivers, apart from the particular wireless power receiver, may be kept from transmitting information to the wireless power transmitter in a slot allocated for the particular wireless power receiver.

More specifically, other wireless power receivers, apart from the particular wireless power receiver, may determine whether a slot is an allocated slot or not, through the slot sync preceding the allocated slot. If the slot is an allocated slot and this allocated slot is not for themselves, other wireless power receivers, apart from the particular wireless power receiver, may not transmit information to the wireless power transmitter.

The free slot may be a type of slot that a certain wireless power receiver may use freely. That is, the free slot may be a slot in which a certain wireless power receiver can transmit information to the wireless power transmitter.

More specifically, if a free slot is available for any one of multiple wireless power receivers that are in communication with the wireless power transmitter, the wireless power receiver may transmit information to the wireless power transmitter.

The availability of a free slot may mean that the multiple wireless power receivers have not yet transmitted information to the wireless power transmitter through the free slot.

In contrast, the unavailability of a free slot may mean that any one of the multiple wireless power receivers is transmitting information to the wireless power transmitter through the free slot.

Upon completion of information transfer from one of the wireless power receivers, another wireless power receiver may transmit information to the wireless power transmitter through the free slot.

That is, one of the wireless power receivers and another wireless power receiver may use the free slot in a competitive manner. At this point, the wireless power transmitter may determine which of the multiple wireless power receivers the information received through the free slot is from. More specifically, the wireless power transmitter may determine which wireless power receiver has transmitted the information, based on identification information contained in the information received through the free slot. In this case, the identification information may be a slot number assigned to the wireless power receiver that has transmitted the information.

The locked slot may be a type of slot that is locked for temporary use by a particular wireless power receiver. More specifically, the locked slot may be a slot that is accessible only by a particular wireless power receiver in a start-up sequence to allow the particular wireless power receiver to perform the start-up sequence.

The start-up sequence may refer to a process of providing information associated with the start-up sequence so that a particular wireless power receiver can communicate with the wireless power transmitter. More specifically, the start-up sequence may mean that a particular wireless power receiver operates in the configuration phase or the negotiation phase. The information associated with the start-up sequence is information that is set according to a protocol, and may include identification information of the particular wireless power receiver, power control information, etc.

The locked slot may keep other wireless power receivers, apart from the particular wireless power receiver, from transmitting information. More specifically, when a locked slot is detected through a slot sync, other wireless power receiver may not transmit information to the wireless power transmitter through the locked slot.

The locked slot is only temporary, and may be converted into a free slot upon completion of the start-up sequence of the particular wireless power receiver.

Each of the multiple slots may be limited in length. For example, each of the multiple slots may be 50 ms long. As such, the wireless power receiver may transmit approximately 5 bytes of data per slot.

The wireless power transmitter may save slot information for each of the multiple slots constituting the slotted frame. The slot information is unique identification information of each slot, by which the slots can be distinguished from one another. For example, the slot information may be a slot number.

The slot number may be data of a predetermined size. For example, the slot number may be 4 bits large.

The slot number may be a number that is sequentially assigned to each slot, starting from a reference slot. Also, the slot number may be an unsigned integer. For example, the wireless power transmitter may set the slot immediately following the measurement slot of the slotted frame to 1, and may sequentially set the remaining slots to 2 to 9, following the slot set to 1.

The slot number may be used as identification information of a wireless power receiver. For example, a wireless power receiver may transmit information to the wireless power transmitter through a free slot. In this case, the wireless power receiver may incorporate a slot number in the information to be transmitted to the wireless power transmitter. This allows the wireless power transmitter to identify the information as received from the wireless power receiver to which the slot is allocated.

The slotted frame structure may be readily modified by those skilled in the art, and the communication method to be described below applies equally regardless of the slotted frame structure.

The free-format frame structure will be discussed with reference to FIG. 20B. The free-format frame may not have any specific format, apart from a frame sync indicating the start of the frame and a measurement slot. That is, the free-format frame serves a different function from the slotted frame: for example, the free-format frame may be used to perform communication of long data packets (e.g., optionally proprietary data packets) between a wireless power transmitter and a wireless power receiver, or may be used to allow a wireless power transmitter consisting of multiple coils to determine which coil to activate.

More specifically, the free-format frame may serve to transmit data packets longer than the slots of the slotted frame (e.g., data packets longer than 5 bytes) to the wireless power transmitter.

Also, the free-format frame may be used to receive specific information from at least one wireless power receiver so that the wireless power transmitter consisting of multiple coils determines which coil to use for transmitting power to the wireless power receiver.

More specifically, the wireless power transmitter may sequentially activate one or more of the multiple coils. With one or more coils being activated, the wireless power transmitter may receive specific information (e.g., a signal strength packet) using the free-format frame. In this case, the wireless power transmitter may determine which coil to activate for power transmission, based on the specific information.

The frame structures have been described so far.

Now, a sync pattern contained in each frame will be discussed in more details with reference to the drawings.

The sync pattern, which is a signal containing information regarding slots, may come in various formats. For example, the sync pattern may be in a pattern or in a packet.

At least one sync pattern may exist in a frame structure. For example, a sync pattern may be at the front of each slot or only at the foremost part of a frame. In an example, in a frame consisting of multiple slots, the sync pattern may be at the foremost part of the frame and between each slot. In another example, the sync pattern may be only at the foremost part of a frame consisting of multiple slots.

The sync pattern may contain various information. For example, the sync pattern may contain slot status information, frame status information, frame structure information, communication status information, etc.

For example, referring to FIG. 21, the sync pattern may consist of a preamble, a start bit, a response field, a type field, an info field, and a parity bit. In FIG. 21, the start bit is shown to be ZERO.

More specifically, the preamble consists of consecutive bits, and all of these bits may be set to 0. That is, the preamble may consist of bits for adjusting the time length of the sync pattern.

The number of bits in the preamble may be dependent on operating frequency, in such a way that the length of the sync pattern is as close to 50 ms as possible but does not exceed 50 ms. For example, if the operating frequency is 100 kHz, the sync pattern may comprise two preamble bits, or if the operating frequency is 105 kHz, the sync pattern may comprise three preamble bits.

The start bit is a bit following the preamble, and may indicate ZERO. The ZERO may be a bit indicating the type of the sync pattern. Sync pattern types may include a frame sync containing information regarding a frame and a slot sync containing slot information. That is, the sync pattern may be a frame sync which is positioned between consecutive frames and indicates the start of the frame, or a slot sync which is positioned between two consecutive slots in the frame. For example, if the ZERO is 0, this means that the sync pattern is a slot sync positioned between slots, or if the ZERO is 1, this means that the sync pattern is a frame sync positioned between frames.

The parity bit is the last bit of the sync pattern, and may indicate the number of bits in the data fields (i.e., response field, type field, and info field) of the sync pattern. For example, if the number of bits in the data fields of the sync pattern is even, the parity bit may be 1; otherwise (i.e., if the number of bits in the data fields of the sync pattern is odd), the parity bit may be 0.

The response field may contain information on the wireless power transmitter's response for communication with the wireless power receiver within the slot preceding the sync pattern. For example, the response field may have a value of '00' if no communication with a wireless power receiver is detected, and may have a value of '01' if a communication error is detected in communication with a wireless power receiver. The communication error may involve a collision between two or more wireless power receivers, caused by the two or more wireless power receivers' attempt to access the same slot.

Also, the response field may contain information indicating whether a data packet is accurately received from a wireless power receiver or not. More specifically, the response field may have a value of '10' (10—not acknowledge, NAK) if the wireless power transmitter denies the data packet and a value of '11' (11—acknowledge, ACK) if the wireless power transmitter confirms the data packet.

The type field may indicate the type of the sync pattern. More specifically, if the sync pattern is the first sync pattern of a frame (i.e., the first sync pattern of a frame preceding the measurement slot), the type field may have a value of '1' indicating frame sync.

In the case of a slotted frame, if the sync pattern is not the first sync pattern of the frame, the type field may have a value of '0' indicating slot sync.

The value of the info field may indicate different types of information, depending on the type of the sync pattern indicated by the type field. For example, if the type field is 1 (i.e., frame sync), the info field may indicate frame type. That is, the info field may indicate whether the current frame is a slotted frame or a free-format frame. For example, the info field with a value of '00' may indicate a slotted frame, and the info field with a value of '01' may indicate a free-format frame.

On the contrary, if the type field is 0 (i.e., slot sync), the info field may indicate the status of the next slot that follows the sync pattern. More specifically, the info field may have a value of '00' if the next slot is a slot allocated for a particular wireless power receiver, a value of '01' if the next slot is a slot that is locked for temporary use by a particular wireless power receiver, and a value of '10' if the next slot is a slot that a certain wireless power receiver may use freely.

The sync pattern structures have been described so far.

Figure 22:
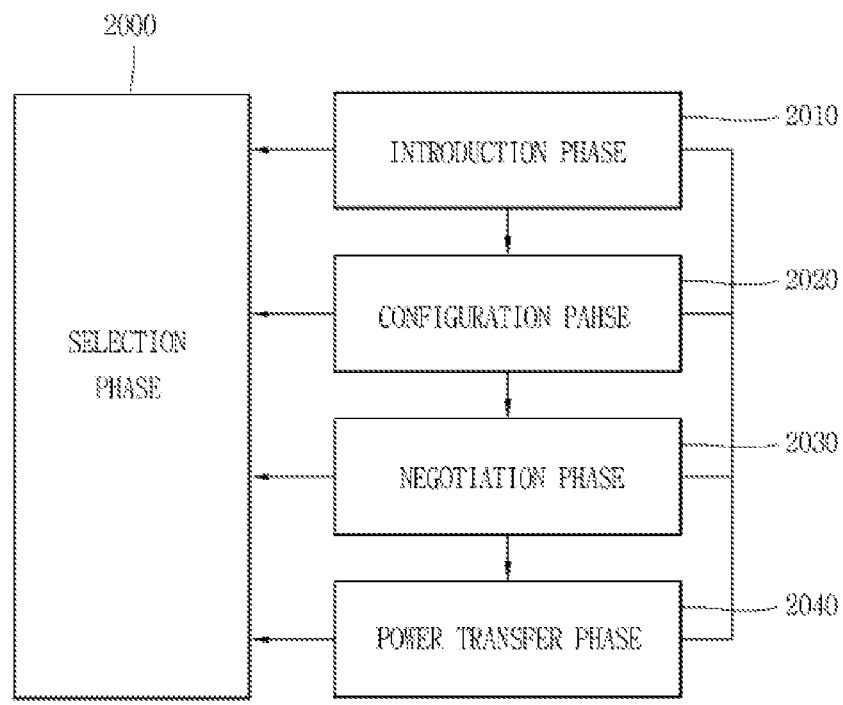
FIG. 22 illustrates the operation phases of a wireless power transmitter and a wireless power receiver that are in many-to-one communication.
Figure 23A:
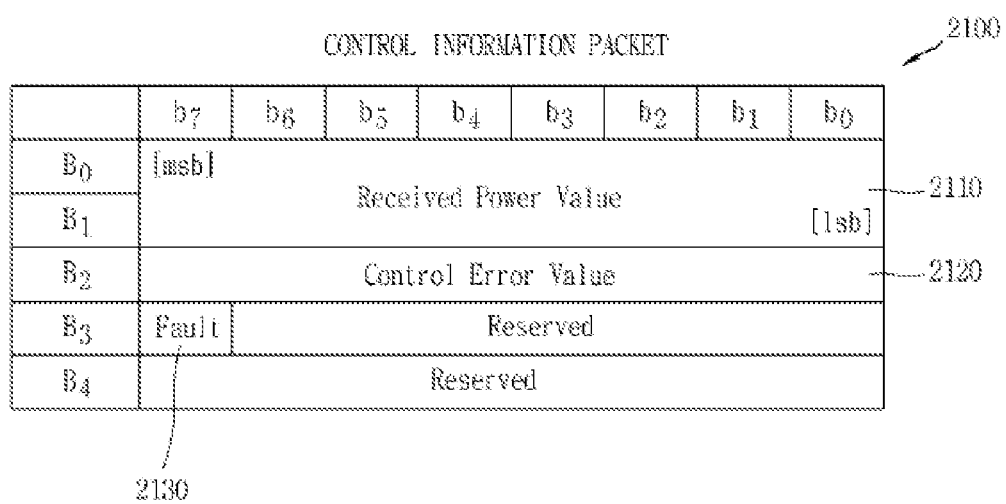
FIGS. 23A and 23B are views showing the structures of a control information packet.
Figure 23B:
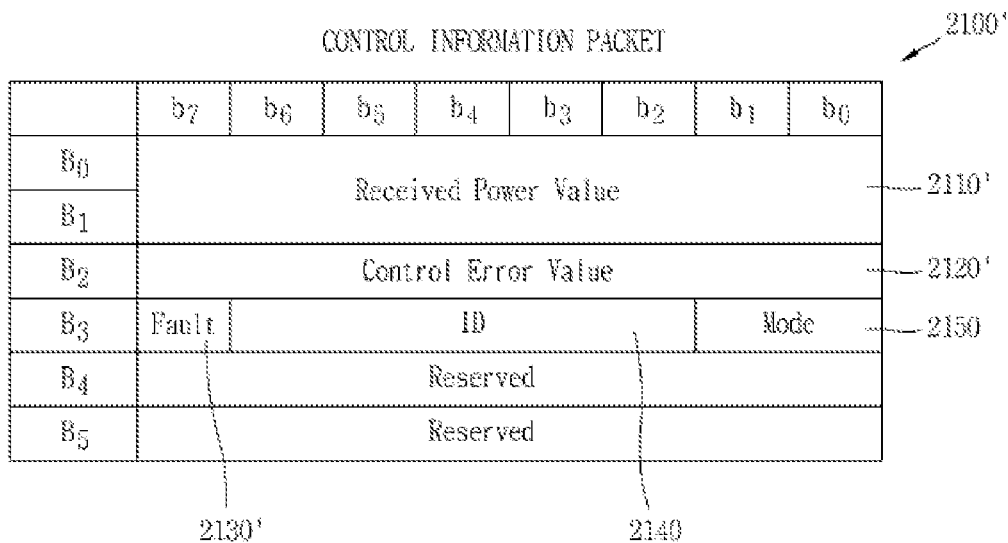
Figure 24:
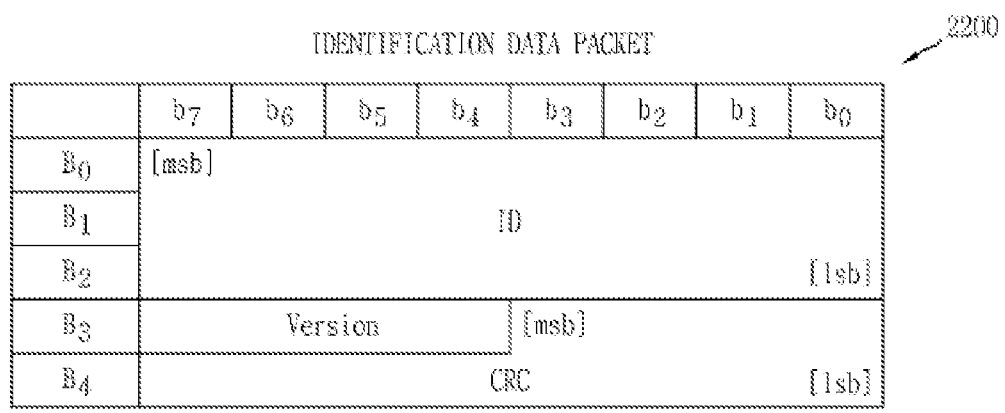
FIG. 24 illustrates the structure of an identification data packet.

Hereinafter, the operation phases of a wireless power receiver in the shared mode will be discussed in more details. FIG. 22 illustrates the operation phases of a wireless power transmitter and a wireless power receiver that are in many-to-one communication. FIGS. 23A and 23B are views showing the structures of a control information packet. FIG. 24 illustrates the structure of an identification data packet. FIG. 25 illustrates the structure of a configuration packet. FIGS. 27A, 27B, and 27C illustrate the structures of an end power transfer packet. FIGS. 28A and 28B illustrate the structures of a charge status packet.

Referring to FIG. 22, in the shared mode, a wireless power receiver may operate in any of the following phases: a selection phase 2000, an introduction phase 2010, a configuration phase 2020, a negotiation phase 2030, and a power transfer phase 2040.

First of all, a wireless power transmitter according to an exemplary embodiment of the present invention may transmit a wireless power signal in order to detect a wireless power receiver. As described earlier with reference to FIG. 13, the process of detecting a wireless power receiver using a wireless power signal may be referred to as analog ping.

Upon receiving the wireless power signal, the wireless power receiver may enter the selection phase 2000. Once the wireless power receiver enters the selection phase 2000, it may detect the presence of an FSK signal in the wireless power signal, as explained earlier.

That is, the wireless power receiver may perform communication in either the exclusive mode or the shared mode, depending on the presence or absence of the FSK signal.

More specifically, if the FSK signal is contained in the wireless power signal, the wireless power receiver may operate in the shared mode; otherwise, it may operate in the exclusive mode.

If the wireless power receiver operates in the exclusive mode, the wireless power receiver may implement the operation phases explained with reference to FIG. 13.

If the wireless power receiver operates in the shared mode, the wireless power receiver may enter the introduction phase 2010. In the introduction phase 2010, the wireless power receiver may transmit a control information packet (CI) 2100 to the wireless power transmitter, in order to transmit the control information packet in the selection phase, negotiation phase, and power transfer phase. That is, the control information packet may be transmitted to the wireless power transmitter, regardless of the operation phases of the wireless power receiver. For example, the control information packet may have a predetermined time length, and the wireless power receiver may periodically transmit the control information packet to the wireless power transmitter.

Moreover, the control information packet may contain a header and have a predetermined size. For example, the control information packet may contain a header with a value of '0x53' and have a size of 5.

In addition, the control information packet may contain control-related information. The control-related information may include a received power value, a control error value, and end power transfer request information (fault). The control-related information may further include identification information of the wireless power receiver.

The control information packet may have various structures.

For example, referring to FIG. 23A, the control information (IC) packet 2100 may include a received power value 2110, a control error value 2120, and end power transfer request information (fault) 2130.

The received power value 2110 may indicate a measure of the average received power at the wireless power receiver from the wireless power transmitter. Further, the control error value 2120 may be input data for the operating point of the wireless power transmitter.

In another example, referring to FIG. 23B, the control information (CI) packet 2100' may include a received power value 2110', a control error value 2120', end power transfer request information (fault) 2130', identification information 2410, and mode information 2150.

The identification information 2410 may be unique information of the wireless power receiver. That is, the identification information may a type of information that a plurality of wireless power receivers communicating with a wireless power transmitter provides to the wireless power transmitter, by which the wireless power receivers can be distinguished from one another.

For example, the identification information 2410 may be the wireless power receiver's product number (e.g., serial number) or slot information. The slot information may be a slot number that is assigned to each slot provided to the wireless power receiver from the wireless power transmitter.

The wireless power transmitter may control the power transmitted to a wireless power receiver by using a control information packet received from the wireless power receiver. For example, the wireless power transmitter may use the received power value 2110 as the average value of the measurement slot. For example, the wireless power transmitter may increase or decrease the amount of current through the coils of the power converter 111 of the wireless power transmitter as the control error value 2120 increases or decreases.

The wireless power transmitter may receive the control information (IC) packet from the wireless power receiver within any one of the multiple slots. For example, the wireless power transmitter may receive the control information from the wireless power receiver within the first slot in the first frame.

The wireless power transmitter may transmit an ACK (Acknowledge) signal if the first slot is available, or an NAK (not-Acknowledge) signal if the first slot is not available.

More specifically, the wireless power transmitter may transmit the ACK signal to the wireless power receiver if the control information is successfully received within the first slot, and may transmit the NAK signal to the wireless power receiver if another wireless power receiver, apart from the one that has transmitted the control information (IC) packet, is implementing the configuration phase 2020 or the negotiation phase 2030.

If the ACK signal is transmitted to the wireless power receiver, the wireless power transmitter may allocate the first slot for the wireless power receiver. In this case, the wireless power receiver may transmit the control information (CI) packet through the allocated first slot, in the configuration phase 2020, negotiation phase 2030, and power transfer phase 2040. That is, upon receiving the ACK signal, the wireless power receiver may always transmit the control information (CI) packet, regardless of the operation phases of the wireless power receiver.

The wireless power transmitter may allocate the first slot to the wireless power receiver and then save the slot number of the first slot. For example, the wireless power transmitter may save the slot number (e.g., 1) of the first slot. The wireless power transmitter may recognize by the slot number that the first slot has been allocated.

Upon receiving the ACK signal for the control information packet, the wireless power receiver may count the number of slot syncs received after the reception of the ACK signal. The wireless power receiver may calculate slot information based on the number of slot syncs. For example, if the wireless power receiver has received 8 slot syncs after the reception of the first slot, the slot number may be calculated to be 1.

The wireless power receiver may use the calculated slot number as identification information. For example, the wireless power receiver may incorporate the calculated slot number, as identification information, in information to be transmitted to the wireless power transmitter, and then transmit the information to the wireless power transmitter. For example, the wireless power receiver may incorporate a slot number in a control information packet and transmit the control information packet with the slot number to the wireless power transmitter.

The information to be transmitted to the wireless power transmitter may be a control information packet, information associated with the configuration phase, information associated with the negotiation phase, end power transfer request information, charge status information, etc. that are configured for the wireless power receiver to transmit to the wireless power transmitter, according to a wireless power transfer protocol.

On the contrary, if the NAK signal is transmitted to the wireless power receiver, the wireless power transmitter may not allocate the first slot for the wireless power receiver. In this case, the wireless power receiver, which has not received the first slot, may re-transmit the control information (CI) packet, within one of the other slots apart from the first slot, until it receives the ACK signal.

If the wireless power transmitter transmits the ACK signal to permit the wireless power receiver to enter the configuration phase 2020, it may provide locked slots exclusively for the wireless power receiver's use. More specifically, the wireless power transmitter may provide the wireless power receiver with locked slots, to which other wireless power receivers have no access. In this case, the wireless power receiver may implement the configuration phase and the negotiation phase by using the locked slots, without colliding with other wireless power receivers.

The configuration phase 2020 may be a phase in which the wireless power receiver transmits information associated with the configuration phase 2020 so that the wireless power receiver can receive power efficiently. More specifically, the configuration phase 2020 may be a phase in which, in the shared mode, identification information of the wireless power receiver is provided to the wireless power transmitter so that the wireless power transmitter can distinguish each wireless power receiver from one another.

That is, in the configuration phase 2020, the wireless power transmitter may receive information associated with the configuration phase 2020, within the locked slots, from the wireless power receiver. The information associated with the configuration phase 2020 may include identification data packets, optional proprietary data packets, a CFG (configuration) packet, etc.

Referring to FIG. 24, the identification data packets may comprise an IDHI packet and an IDLO packet. The header of the IDHI packet may have a value of OX54, and the header of the IDLO packet may have a value of OX55. Further, the identification data packets may comprise unique identification (ID) information for identifying the wireless power receiver, version information of the wireless power transfer protocol that applies to the wireless power receiver, and cyclic redundancy check (CRC) information for detecting errors in the identification information.

The optional proprietary data packets are data packets of 5 bytes or larger, which may be received by the wireless power transmitter through a free-format frame. The optional proprietary data packets are information associated with the proprietorship of the wireless power receiver, for example, information about the manufacturer of the wireless power receiver.

Referring to FIG. 25, the CFG packet 2700 may contain count information including the number of additional data packets, depth information including a scaling factor for calculating FSK modulation depth, maximum power information, power class information indicating which power class (low, mid, or high) the wireless power receiver belongs to, negotiation (Neg) phase information provided only in the exclusive mode, an indicator (prop) of the method of determining the amount of current in a primary cell at the wireless power transmitter, the polarity of an FSK signal, window offset information, and so on. In the configuration phase, the depth information may include polarity information of the wireless power receiver.

Upon receiving information associated with the configuration phase 2020, the wireless power transmitter may send any of the following: an ACK signal, an NAK signal, a communication-free signal, and a communication error signal as a response to the wireless power receiver.

More specifically, the wireless power transmitter may send the NAK signal to the wireless power receiver upon detecting a CRC error in the identification data packets IDHI and IDLO; otherwise, the wireless power transmitter may send the ACK signal to the wireless power receiver.

If the wireless power receiver returns to the configuration phase 2020 from the power transfer phase 2040, based on an EPT/reconfigure packet, in order to reconfigure the power transfer protocol, the identification data packets may be transmitted to the wireless power transmitter or not.

If the optional proprietary data packets are not recognizable because they are different from prescribed data, the wireless power transmitter may transmit the NAK signal to the wireless power receiver; otherwise, it may properly transmit the ACK signal or NAK signal for specific proprietary data packets. To receive the optional proprietary data packets, the wireless power receiver may transmit, to the wireless power transmitter, insert free-format frame information requesting a free-format frame so that it can use the free-format frame.

Moreover, upon receiving the CFG packet, the wireless power transmitter may send the ACK signal as a response to the information contained in the CFG packet.

When the wireless power transmitter transmits a communication-free signal or a communication error signal, in response to the information associated with the configuration phase 2020, the wireless power receiver may re-transmit the data packets for which the communication-free signal or the communication error signal has been received.

The wireless power receiver may enter the negotiation phase 2030 after receiving the information associated with the configuration phase 2020. In other words, upon receiving the CFG packet in the configuration phase 2020, the wireless power transmitter may permit the wireless power receiver to enter the negotiation phase 2030.

The negotiation phase 2030 may be a phase in which the wireless power receiver transmits information associated with the negotiation phase 2030 to the wireless power transmitter so as to efficiently transmit power to the wireless power receiver. More specifically, the negotiation phase 2030 may be a phase in which, in the shared mode, the wireless power receiver provides the wireless power transmitter with information on the power needed for the wireless power receiver.

In this case, the wireless power transmitter may continue to provide locked slots in the configuration phase 2020 as it has done in the configuration phase 2020. That is, by providing locked slots, the wireless power transmitter ensures implementation of the negotiation phase 2030, without a collision between the wireless power receiver and another wireless power receiver.

The wireless power receiver may transmit the information associated with the negotiation phase 2030 by using the locked slots. In other words, the wireless power transmitter may receive the information associated with the negotiation phase 2030 from the wireless power receiver, within the locked slots.

The information associated with the negotiation phase 2030 may include optional proprietary data packets, negotiation data packets, and an SRQ/en (end-negotiation) packet. The negotiation data packets may include specific request (SRQ) packets and general request (GRQ) packets.

Referring to FIG. 26, an SRQ packet 2800 may contain a request and a request value. The request may be any of the following: end negotiation, guaranteed power, received power packet type, modulation depth, maximum power, and insert free-format frame. The request value may include a variable which is determined based on the request.

The SRQ/en packet may contain information requesting the end of the negotiation phase 2030. Upon receiving the SRQ/en packet, the wireless power receiver may end the negotiation phase 2030 and enter the power transfer phase 2040.

Upon receiving information associated with the negotiation phase 2030, the wireless power transmitter may send any of the following: an ACK signal, an NAK signal, a communication-free signal, and a communication error signal as a response to the wireless power receiver.

More specifically, the wireless power transmitter may send to the wireless power receiver the ACK signal or NAK signal for the negotiation data packets.

If the optional proprietary data packets are not recognizable because they are different from prescribed data, the wireless power transmitter may transmit the NAK signal to the wireless power receiver; otherwise, it may properly transmit the ACK signal or NAK signal.

When the wireless power transmitter receives a communication-free signal or a communication error signal, in response to the information associated with the negotiation phase 2030, it may re-transmit the data for which the communication-free signal or the communication error signal has been received.

Upon completion of the reception of the information associated with the negotiation phase 2030, the wireless power transmitter may enter the power transfer phase 2040. For example, upon receiving the SRQ/end packet, the wireless power transmitter may transmit the ACK signal, and the wireless power receiver may enter the power transfer phase 2040.

In this case, when the negotiation phase 2030 is completed, the wireless power transmitter may suspend the provision of the locked slots to the wireless power receiver. That is, in the power transfer phase 2040, the wireless power receiver cannot transmit data packets any more through the locked slots.

The locked slots may be converted into free slots through which data packets can be received from other wireless power receivers (in other words, data packets are available to other wireless power receivers).

The power transfer phase 2040 may refer to a wireless power transfer phase. In the power transfer phase 2040, the wireless power receiver may continue to transmit a control information (CI) packet through the allocated first slot. Also, the wireless power receiver may transmit one or more data packets freely through free slots. The one or more data packets may be information associated with the power transfer phase 2040.

If at least one wireless power receiver is in the power transfer phase 2040, the wireless power transmitter may receive information associated with the power transfer phase 2040 from the at least one wireless power receiver through free slots.

In this case, the wireless power transmitter may determine which of the at least one wireless power receiver the information associated with the power transfer phase has been received from, based on the identification information contained in the information associated with the power transfer phase that is received through the free slots.

The information associated with the power transfer phase may comprise an end power transfer packet, a CHS2 (charge status packet), and proprietary data packets.

The end power transfer packet may contain a header and have a predetermined size. For example, the end power transfer packet may contain a header with a value of '0x02' and have a size of 2.

In addition, the end power transfer packet may contain an end power transfer request message. The end power transfer request message may contain end power transfer request information and slot information.

The end power transfer packet may have various formats. For example, referring to FIG. 27A, the end power transfer packet 2900 may have a format in which a slot number 2910 and an end power transfer request code 2910 appear in sequence.

In another example, referring to FIG. 27B, the end power transfer packet 2930 may have a format in which an end power transfer code 2920' and a slot number 2910' appear in sequence The format of the end power transfer packet may be determined by the designer or according to a protocol.

Referring to FIG. 27C, the end power transfer code may include any of the following: unknown, charging complete, internal fault such as software fault or logical fault, over-temperature, over-voltage, over-current, battery failure, reconfigure, no response to a control information packet or control error packet, and renegotiate.

In this case, the wireless power transmitter may control the power being transmitted to the wireless power receiver, based on the end power transfer code. For example, if the end power transfer request code includes reconfigure, the wireless power transmitter may suspend the transfer of power being transmitted to the wireless power receiver and provide locked slots to the wireless power receiver. At this point, the wireless power receiver may change from the power transfer phase 2040 to the configuration phase 2010 to operate in the configuration phase 2010, and transmit information associated with the configuration phase 2010 to the wireless power transmitter.

The slot information may include a slot number assigned to the wireless power receiver.

The charge status packet may contain a header and have a predetermined size. For example, the charge status packet may contain a header with a value of '0x22' and have a size of 2.

The charge status packet may contain a charge status value and slot information.

The charge status value may be the current charging level of a battery for the wireless power receiver. The battery may be a rechargeable storage device that is contained in the wireless power receiver to power the wireless power receiver. The charging level can be shown in percentage. For example, the charging level may range from 0 to 100. If the charging level is 0, this means the lack of battery power, and if the charging level is 100, this means that the battery is fully charged.

If the wireless power receiver contains no battery, the wireless power receiver may not transmit the charge status packet.

The slot information may be a slot number assigned to the wireless power receiver by the wireless power transmitter.

The charge status packet may have various formats.

For example, the charge status packet 3000 may contain a slot number 2010 and a charge status value 3020. The position of the slot number in the charge status packet 3000 may be easily changed according to a protocol or by the designer. For example, referring to FIG. 28A, the charge status packet 3000 may have a structure in which a slot number 3010 and undefined bits appear in sequence. In another example, referring to FIG. 28B, the charge status packet 3000' may have a format in which undefined bits and a slot number 3010' appear in sequence The format of the charge status packet may be determined by the designer or according to a protocol.

The proprietary data packets are data packets that are optionally generated by the wireless power receiver. For example, they may include information about the manufacturer of the wireless power receiver. The proprietary data packets may contain slot information if any one of the multiple slots is assigned to the wireless power receiver.

Similarly, if the proprietary data packets are transmitted to the wireless power transmitter through free slots, they may likewise contain slot information so that the wireless power transmitter can recognize the wireless power receiver that has transmitted the proprietary data packets.

The wireless power transmitter may control the wireless power receiver, based on the end power transfer packet from the wireless power receiver. For example, if reconfigure is contained in the end power transfer packet, the wireless power receiver may return to the configuration phase 2020 from the power transfer phase 2040.

Aside from the above-described information, the information transmitted to the wireless power transmitter through the free slots may further include slot information. Based on the slot information, the wireless power transmitter may determine which wireless power receiver the information received through the free slots is from.

The operation phases of a wireless power receiver in the shared mode and the structures of packets transmitted in each operation phase have been described so far.

In the present invention, a wireless power transmitter communicating with at least one wireless power receiver may be provided with the source of information received from the at least one wireless power receiver, by using slot information.

Therefore, the wireless power transmitter may recognize the source of information received from at least one wireless power receiver.

It would be easily understood by those skilled in the art that the configuration of a wireless power transmitter according to the exemplary embodiment disclosed herein may be applicable to such devices as docking stations, terminal cradle devices, and other electronic devices, except in cases where it is applicable only to wireless chargers.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A wireless power transmitter which performs communication with one or more wireless power receivers, the wireless power transmitter comprising:
    a power converter including at least one coil configured to convert current into magnetic field; and
    a power transmission controller configured to communicate with a wireless power receiver based on a frame,
    wherein the frame includes a sync pattern and a plurality of slots which have different slot numbers respectively,
    wherein the sync pattern indicates a first slot as allocated to the wireless power receiver,
    wherein the power transmission controller receives a first packet from the wireless power receiver in the first slot having a first slot number, and receives a second packet from the wireless power receiver in a second slot having a second slot number, and
    wherein the second packet includes an information field indicating the first slot number.

2. The wireless power transmitter of claim 1, wherein the power transmission controller transmits an ACK (acknowledge) to the wireless power receiver when the power transmission controller receives the second packet without collision.

3. The wireless power transmitter of claim 1, wherein the power transmission controller allocates the first slot to the wireless power receiver during a negotiation phase.

4. The wireless power transmitter of claim 1, wherein the second slot is a free slot in which any wireless power receiver is allowed to transmit a message competitively.

5. The wireless power transmitter of claim 1, wherein the second packet is an end power transfer packet which includes another information field indicating an end power transfer code.

6. A method of controlling a wireless power transmitter performing communication with one or more wireless power receivers, the method comprising:
    transmitting power to a wireless power receiver in a wireless manner; and
    communicating with the wireless power receiver based on a frame, the frame including a sync pattern and a plurality of slots which have different slot numbers respectively,
    wherein the sync pattern indicates a first slot as allocated to the wireless power receiver
    wherein the communicating includes:
        receiving a first packet from the wireless power receiver in a first slot having a first slot number; and
        receiving a second packet from the wireless power receiver in a second slot having a second slot number, the second packet including an information field indicating the first slot number.

7. The method of claim 6, wherein the communicating further comprises:
    transmitting an ACK (acknowledge) to the wireless power receiver when the second packet is received without collision.

8. The method of claim 6, wherein the communicating further comprises:
    allocating the first slot to the wireless power receiver during a negotiation phase.

9. The method of claim 6, wherein the second slot is a free slot in which any wireless power receiver is allowed to transmit a message competitively.

10. The method of claim 6, wherein the second packet is an end power transfer packet which includes another information field indicating an end power transfer code.

11. A wireless power receiver which performs communication with a wireless power transmitter, the wireless power receiver comprising:
    a power receiving part comprising at least one coil to convert magnetic field into current; and a power reception controller that communicates with the wireless power transmitter based on a frame, the frame including a sync pattern and a plurality of slots which have different slot numbers respectively, wherein the sync pattern indicates a first slot as allocated to the wireless power receiver, wherein the power reception controller is configured to transmit a first packet to the wireless power transmitter in the first slot having a first slot number, wherein the power reception controller is configured to transmit a second packet to the wireless power transmitter in a second slot having a second slot number, and wherein the second packet includes an information field indicating the first slot number.

12. The wireless power receiver of claim 11, wherein the power reception controller receives an ACK (acknowledge) from the wireless power transmitter when the second packet is transmitted to the wireless power transmitter without collision.

13. The wireless power receiver of claim 11, wherein the first slot is allocated to the wireless power receiver during a negotiation phase.

14. The wireless power receiver of claim 11, wherein the second slot is a free slot in which any wireless power receiver is allowed to transmit a message competitively.

15. The wireless power receiver of claim 11, wherein the second packet is an end power transfer packet which includes another information field indicating an end power transfer code.

16. A method of controlling a wireless power receiver performing communication with a wireless power transmitter, the method comprising:

receiving power from the wireless power transmitter in a wireless manner; and communicating with the wireless power transmitter based on a frame, the frame including a sync pattern and a plurality of slots have different slot numbers respectively, wherein the sync pattern indicates a first slot as allocated to the wireless power receiver, wherein the communicating includes:

transmitting a first packet to the wireless power transmitter in the first slot having a first slot number; and transmitting a second packet to the wireless power transmitter in a second slot having a second slot number, the second packet including an information field indicating the first slot number.

17. The method of claim 16, wherein the communicating further comprises:

receiving an ACK (acknowledge) from the wireless power transmitter when the second packet is transmitted to the wireless power transmitter without collision.

18. The method of claim 16, wherein the first slot is allocated to the wireless power receiver during a negotiation phase.

19. The method of claim 16, wherein the second slot is a free slot in which any wireless power receiver is allowed to transmit a message competitively.

20. The method of claim 16, wherein the second packet is an end power transfer packet which includes another information field indicating an end power transfer code.

* * * * *